United States Patent
Singh

(10) Patent No.: US 9,069,945 B2
(45) Date of Patent: Jun. 30, 2015

(54) USER VALIDATION IN A SOCIAL NETWORK

(76) Inventor: Puneet Singh, Winnetka, IL (US)

( * ) Notice: Subject to any disclaimer, the term of this patent is extended or adjusted under 35 U.S.C. 154(b) by 272 days.

(21) Appl. No.: 13/040,462

(22) Filed: Mar. 4, 2011

(65) Prior Publication Data

US 2012/0226701 A1 Sep. 6, 2012

(51) Int. Cl.
| | | |
|---|---|---|
| G06Q 10/10 | (2012.01) | |
| G06Q 30/02 | (2012.01) | |
| G06Q 10/06 | (2012.01) | |
| G06Q 40/02 | (2012.01) | |
| G06Q 99/00 | (2006.01) | |
| G06F 21/40 | (2013.01) | |
| G06Q 50/00 | (2012.01) | |

(52) U.S. Cl.
CPC ............... *G06F 21/40* (2013.01); *G06Q 50/01* (2013.01)

(58) Field of Classification Search
USPC .................................................. 705/1.1–912
See application file for complete search history.

(56) References Cited

U.S. PATENT DOCUMENTS

| | | | |
|---|---|---|---|
| 7,318,037 B2 | 1/2008 | Solari | |
| 7,359,894 B1 | 4/2008 | Liebman et al. | |
| 7,596,597 B2 | 9/2009 | Liu et al. | |
| 7,703,030 B2 | 4/2010 | Smirin et al. | |
| 7,707,122 B2 | 4/2010 | Hull et al. | |
| 7,716,140 B1 | 5/2010 | Nielsen et al. | |
| 7,720,855 B2 | 5/2010 | Brown | |
| 7,730,216 B1 | 6/2010 | Issa et al. | |
| 7,739,139 B2 | 6/2010 | Robertson et al. | |
| 7,752,082 B2 | 7/2010 | Calabria | |
| 7,756,756 B1 | 7/2010 | Lifson | |
| 7,761,342 B2 | 7/2010 | Calabria | |
| 7,761,399 B2 | 7/2010 | Evans | |
| 7,801,971 B1 | 9/2010 | Amidon et al. | |
| 7,805,488 B2 | 9/2010 | McCuller | |
| 7,805,518 B1 | 9/2010 | Kamvar et al. | |
| 7,827,265 B2 | 11/2010 | Cheever et al. | |
| 7,831,483 B1 | 11/2010 | Lifson | |
| 8,221,238 B1 * | 7/2012 | Shaw et al. | 463/42 |
| 2008/0140566 A1 * | 6/2008 | Chowins | 705/39 |
| 2011/0112957 A1 * | 5/2011 | Ingram et al. | 705/38 |
| 2011/0113098 A1 * | 5/2011 | Walsh et al. | 709/204 |
| 2011/0276507 A1 * | 11/2011 | O'Malley | 705/321 |
| 2011/0307397 A1 * | 12/2011 | Benmbarek | 705/319 |

* cited by examiner

*Primary Examiner* — Jonathan Ouellette

(74) *Attorney, Agent, or Firm* — Ash Tankha; Lipton, Weinberger & Husick

(57) ABSTRACT

A computer implemented method and system is provided for validating a user associated with one or more social networks. A validation platform associated with the social networks is provided. The validation platform identifies a user for the validation from the social networks. The validation platform retrieves social information of the identified user from the social networks. The social information comprises relationship information of and between the identified user and social contacts of the identified user on the social networks. The validation platform acquires feedback on the identified user from one or more of the social contacts. The validation platform generates one or more validation scores, for example, an evaluation score, a feedback authentication score, a user authentication score, a composite score, etc., for the identified user based on the retrieved social information and/or the acquired feedback. The generated validation scores enable validation of the user associated with the social networks.

26 Claims, 21 Drawing Sheets

| FEEDBACK FORM | | |
|---|---|---|
| SOFT SKILLS | STRONG | WEAK |
| COMMUNICATION SKILLS | ○ ○ ○ ○ ○ | |
| FRIENDLINESS | ○ ○ ○ ○ ○ | |
| INTEGRITY | ○ ○ ○ ○ ○ | |
| DEPENDABILITY | ○ ○ ○ ○ ○ | |
| LOYALTY | ○ ○ ○ ○ ○ | |
| SELF CONFIDENCE | ○ ○ ○ ○ ○ | |
| POSITIVE ATTITUDE | ○ ○ ○ ○ ○ | |
| MOTIVATION | ○ ○ ○ ○ ○ | |
| PROFESSIONALISM | ○ ○ ○ ○ ○ | |
| WORK ETHIC | ○ ○ ○ ○ ○ | |

ANYTHING ELSE YOU WOULD LIKE TO ADD? _____

TECHNICAL SKILLS

| | | |
|---|---|---|
| ANALYTICAL ABILITY | ○ ○ ○ ○ ○ | |
| PROBLEM SOLVING SKILLS | ○ ○ ○ ○ ○ | |
| RESEARCH SKILLS | ○ ○ ○ ○ ○ | |
| COMPUTER LITERACY | ○ ○ ○ ○ ○ | |

ANYTHING ELSE YOU WOULD LIKE TO ADD? _____

LEADERSHIP SKILLS

| | | |
|---|---|---|
| PEOPLE MANAGEMENT SKILLS | ○ ○ ○ ○ ○ | |
| TEAM BUILDING ABILITY | ○ ○ ○ ○ ○ | |
| TEAMWORK | ○ ○ ○ ○ ○ | |
| PLANNING SKILLS | ○ ○ ○ ○ ○ | |
| ORGANIZING SKILLS | ○ ○ ○ ○ ○ | |

ANYTHING ELSE YOU WOULD LIKE TO ADD? _____

SUBMIT

FIG. 8A

EVALUATION SCORE CALCULATION

| SOFT SKILLS | STRONG → → → → WEAK | | | | | WEIGHTS | WEIGHTED SCORE |
|---|---|---|---|---|---|---|---|
| # Points per selection | 1 | 0.8 | 0.6 | 0.4 | 0.2 | | |
| COMMUNICATION SKILLS | ○○○○ | ○ | ○ | ● | ○ | 10 | 4 |
| FRIENDLINESS | ○ | ● | ○ | ○ | ● | 5 | 1 |
| INTEGRITY | ○○ | ○ | ○ | ○ | ○ | 10 | 8 |
| DEPENDABILITY | ○ | ○ | ○ | ● | ● | 5 | 2 |
| LOYALTY | ○ | ○ | ○ | ● | ○ | 5 | 1 |
| SELF CONFIDENCE | ● | ○ | ○ | ○ | ○ | 5 | 2 |
| POSITIVE ATTITUDE | ● | ○ | ○ | ○ | ○ | 5 | 5 |
| MOTIVATION | ● | ○ | ○ | ○ | ○ | 5 | 5 |
| PROFESSIONALISM | ○ | ○ | ○ | ● | ○ | 2.5 | 2.5 |
| WORK ETHIC | ○ | ○ | ○ | ● | ○ | 5 | 2 |

ANYTHING ELSE YOU WOULD LIKE TO ADD?

| TECHNICAL SKILLS | | | | | | | |
|---|---|---|---|---|---|---|---|
| ANALYTICAL ABILITY | ○ | ○ | ○ | ● | ○ | 10 | 2 |
| PROBLEM SOLVING SKILLS | ● | ○ | ○ | ● | ○ | 5 | 2 |
| RESEARCH SKILLS | ○ | ○ | ○ | ● | ○ | 2.5 | 2.5 |
| COMPUTER LITERACY | ○ | ○ | ○ | ● | ○ | 5 | 2 |

ANYTHING ELSE YOU WOULD LIKE TO ADD?

| LEADERSHIP SKILLS | | | | | | | |
|---|---|---|---|---|---|---|---|
| PEOPLE MANAGEMENT SKILLS | ○ | ○ | ● | ○ | ○ | 5 | 3 |
| TEAM BUILDING ABILITY | ● | ○ | ○ | ○ | ● | 5 | 1 |
| TEAMWORK | ● | ○ | ○ | ○ | ○ | 5 | 5 |
| PLANNING SKILLS | ● | ○ | ○ | ○ | ○ | 2.5 | 2.5 |
| ORGANIZING SKILLS | ● | ○ | ○ | ○ | ○ | 2.5 | 2.5 |

ANYTHING ELSE YOU WOULD LIKE TO ADD?

SUM OF WEIGHTED SCORE = 55

MAXIMUM POSSIBLE SCORE = 100

EVALUATION SCORE = (55/100)*100 = 55%

FIG. 8B

| FEEDBACK AUTHENTICATION SCORE CALCULATION FOR THE ACQUIRED FEEDBACK | | | | |
|---|---|---|---|---|
| FEEDBACK AUTHENTICATION CRITERIA | RESULT | TRANSLATED SCORE | WEIGHT | WEIGHTED SCORE |
| DEGREE OF SEPARATION WITH THE USER | 1 | 1 | 30 | 30 |
| # OF MUTUAL SOCIAL CONTACTS WITH THE USER | 48 | 1 | 25 | 25 |
| # OF YEARS IN THE USER'S SOCIAL NETWORK | 3 | 0.8 | 25 | 20 |
| # OF FEEDBACK ASSESSMENTS COMPLETED | 15 | 0.8 | 10 | 8 |
| # OF FEEDBACK ASSESSMENTS RECEIVED | 5 | 0.4 | 10 | 4 |

SUM OF WEIGHTED SCORE = 87
MAXIMUM POSSIBLE SCORE = 100
FEEDBACK AUTHENTICATION SCORE = (87/100) * 100 = 87%

FIG. 8C

COMPOSITE SCORE

| COMPONENT | SCORE | WEIGHT | WEIGHTED SCORE |
|---|---|---|---|
| EVALUATION SCORE | 55% | 70 | 38 |
| FEEDBACK AUTHENTICATION SCORE | 87% | 30 | 26 |

SUM OF WEIGHTED SCORE = 64

MAXIMUM POSSIBLE SCORE = 100

COMPOSITE SCORE = 64/100 * 100 = 64%

FIG. 8D

QUERY FORM FOR ABCXYZ COMPANY         DATE: JAN 1, 2011

PLEASE IDENTIFY THE USER WHO YOU WOULD LIKE TO QUERY:

NAME _____
E-MAIL XYZ@GMAIL.COM
...         _____

PLEASE CHECK THE SCORES YOU WOULD LIKE TO QUERY:

☑ COMPOSITE SCORE(S)           ☐ ...
☐ EVALUATION SCORE(S)          ☐ ...
☐ USER AUTHENTICATION SCORE(S) ☐ ...

PLEASE ENTER THE WEIGHTS YOU WOULD LIKE TO ASSIGN TO EACH SCORE:

EVALUATION SCORE:           70% [DEFAULT]
USER AUTHENTICATION SCORE:  30% [DEFAULT]

PLEASE CHECK THE REASON FOR YOUR QUERY:

☑ CANDIDATE FOR EMPLOYMENT
☐ REGISTERED ON DATING WEBSITE
☐ OTHER _____

SUBMIT

FIG. 9A

QUERY PROCESSING FOR ABCXYZ COMPANY...

SOCIAL INFORMATION RETRIEVED FOR XYZ@GMAIL.COM:

| | |
|---|---|
| NAME: | JOHN DOE |
| SEX: | MALE |
| AGE: | 35 |
| # OF SOCIAL NETWORKS: | 1 |
| # OF FIRST DEGREE CONTACTS: | 115 |
| # OF SECOND DEGREE CONTACTS: | 450 |
| # OF THIRD DEGREE CONTACTS: | 1400 |
| LIST OF FIRST DEGREE CONTACTS: | JANE DOE, JACK JONES, ... |
| LIST OF SECOND DEGREE CONTACTS: | BILL BELLAMY, JASON SMITH,... |
| LIST OF THIRD DEGREE CONTACTS: | FAITH ADAMS, JESSICA STEVENS, ... |
| # OF FEEDBACK ASSESSMENTS RECEIVED: | 18 |
| # OF FEEDBACK ASSESSMENTS COMPLETED: | 22 |
| AVERAGE EVALUATION SCORE: | 85 |
| EVALUATION SCORE WEIGHT: | 70% |
| AVERAGE USER AUTHENTICATION SCORE: | 77 |
| USER AUTHENTICATION SCORE WEIGHT: | 30% |
| COMPOSITE SCORE: | 83 |

FIG. 9B

```
NOTIFICATION FOR JOHN DOE (XYZ@GMAIL.COM)

REQUEST DATE:                                      JAN 1, 2011
REQUESTED BY:                                      ABCXYZ COMPANY
REASON FOR QUERY:                                  EMPLOYMENT
WEIGHT SPECIFIED FOR EVALUATION SCORE:             DEFAULT [70%]
WEIGHT SPECIFIED FOR USER AUTHENTICATION SCORE:    DEFAULT [30%]
REQUEST FOR:                                       COMPOSITE SCORE ONLY
COMPOSITE SCORE:                                   83
COMPOSITE SCORE PERCENTILE:                        95%

WOULD YOU LIKE TO ACCEPT THIS REQUEST?      YES    NO
```

FIG. 9C

```
REQUEST RESPONSE NOTICE                            DATE: JAN 10, 2011

REQUEST DATE:                                      JAN 1, 2011
REQUESTED BY:                                      ABCXYZ COMPANY
SCORE REQUESTED FOR:                               XYZ@GMAIL.COM
REASON FOR QUERY:                                  EMPLOYMENT
WEIGHT SPECIFIED FOR EVALUATION SCORE:             DEFAULT [70%]
WEIGHT SPECIFIED FOR USER AUTHENTICATION SCORE:    DEFAULT [30%]
REQUEST FOR:                                       COMPOSITE SCORE ONLY
COMPOSITE SCORE:                                   83
COMPOSITE SCORE PERCENTILE:                        95%
                                                         OK
```

FIG. 9D

| SOCIAL NETWORK PROFILE OF PAUL SHORE | |
|---|---|
| NAME: | PAUL SHORE |
| AGE: | 26 |
| SEX: | MALE |
| DATE OF BIRTH: | MARCH 01, 1984 |
| SCHOOL: | UNIVERSITY OF MICHIGAN |
| COMPOSITE SCORE: | 80 |

FIG. 11A

FEEDBACK REQUEST FORM

PLEASE SELECT FIVE OR MORE SOCIAL CONTACTS FROM WHOM YOU WOULD LIKE TO REQUEST FEEDBACK:

☑ JANE DOE
☑ JACK JONES
☐ BILL BALLAMY
☑ ANDY GRACE
☑ AMAR JACKSON
☐ KATIE BROWN
☑ ZACK PEARCE        SUBMIT

FIG. 11B

| REQUEST # | NAME | REQUEST DATE | STATUS | EVALUATION SCORE | FEEDBACK AUTHENTICATION SCORE | FACTORED INTO THE USER'S COMPOSITE SCORE? |
|---|---|---|---|---|---|---|
| 23 | JANE DOE | JAN 22, 2011 | PENDING | PENDING | PENDING | NO |
| 22 | JACK JONES | JAN 22, 2011 | PENDING | PENDING | PENDING | NO |
| 21 | ANDY GRACE | JAN 22, 2011 | COMPLETE | 90 | 95 | NO |
| 20 | AMAR JACKSON | JAN 22, 2011 | PENDING | PENDING | PENDING | NO |
| 19 | ZACK PEARCE | JAN 22, 2011 | PENDING | PENDING | PENDING | NO |
| 18 | SHAUN WHITE | MARCH 03, 2010 | COMPLETE | 60 | 40 | YES |
| 17 | ETC. | | | | | |

FIG. 11C

| REQUEST # | NAME | REQUEST DATE | STATUS | EVALUATION SCORE | FEEDBACK AUTHENTICATION SCORE | FACTORED INTO THE USER'S COMPOSITE SCORE? |
|---|---|---|---|---|---|---|
| 23 | JANE DOE | JAN 22, 2011 | PENDING | PENDING | PENDING | NO |
| 22 | JACK JONES | JAN 22, 2011 | PENDING | PENDING | PENDING | NO |
| 21 | ANDY GRACE | JAN 22, 2011 | COMPLETE | 90 | 95 | YES |
| 20 | AMAR JACKSON | JAN 22, 2011 | PENDING | PENDING | PENDING | NO |
| 19 | ZACK PEARCE | JAN 22, 2011 | PENDING | PENDING | PENDING | NO |
| 18 | SHAUN WHITE | MARCH 03, 2010 | COMPLETE | 60 | 40 | YES |
| 17 | ETC. | | | | | |

FIG. 11D

| | |
|---|---|
| SOCIAL NETWORK PROFILE OF PAUL SHORE | |
| NAME: | PAUL SHORE |
| AGE: | 26 |
| SEX: | MALE |
| DATE OF BIRTH: | MARCH 01, 1984 |
| SCHOOL: | UNIVERSITY OF MICHIGAN |
| COMPOSITE SCORE: | 85 |

NOTE: YOUR SCORE WAS UPDATED PER FULFILLMENT OF ONE OR MORE OF YOUR FEEDBACK REQUESTS FROM JANUARY 22, 2011. YOU WILL BE ABLE TO REVIEW FEEDBACK AFTER 3 OR MORE OF YOUR FEEDBACK REQUESTS HAVE BEEN FULFILLED.

FIG. 11E

| REQUEST # | NAME | REQUEST DATE | STATUS | EVALUATION SCORE | FEEDBACK AUTHENTICATION SCORE | FACTORED INTO THE USER'S COMPOSITE SCORE? |
|---|---|---|---|---|---|---|
| 23 | JANE DOE | JAN 22, 2011 | COMPLETE | 95 | 77 | YES |
| 22 | JACK JONES | JAN 22, 2011 | PENDING | PENDING | PENDING | NO |
| 21 | ANDY GRACE | JAN 22, 2011 | COMPLETE | 90 | 95 | YES |
| 20 | AMAR JACKSON | JAN 22, 2011 | COMPLETE | 83 | 80 | YES |
| 19 | ZACK PEARCE | JAN 22, 2011 | PENDING | PENDING | PENDING | NO |
| 18 | SHAUN WHITE | MARCH 03, 2010 | COMPLETE | 60 | 40 | YES |
| 17 | ETC. | | | | | |

FIG. 11F

| SOCIAL NETWORK PROFILE OF PAUL SHORE | |
|---|---|
| NAME: | PAUL SHORE |
| AGE: | 26 |
| SEX: | MALE |
| DATE OF BIRTH: | MARCH 01, 1984 |
| SCHOOL: | UNIVERSITY OF MICHIGAN |
| COMPOSITE SCORE: | 88 |

NOTE: YOUR SCORE WAS UPDATED PER FULFILLMENT OF ONE OR MORE OF YOUR FEEDBACK REQUESTS FROM JANUARY 22, 2011. YOU CAN VIEW YOUR FEEDBACK BY CLICKING HERE:
<LINK TO FEEDBACK REVIEW>

FIG. 11G

USER VALIDATION IN A SOCIAL NETWORK

BACKGROUND

A social network refers to an online platform that facilitates interaction and manages social relationships between users registered with the social network. The social network maintains social relationships of a user and enables the user to establish new social relationships. Moreover, the user can exchange and share information with other users of the social network. The users of the social network use the social network for a number of applications. Companies and organizations may use one or more social networks, for example, to screen prospective employees during a rating process, to market their products or services, to observe trends in an industry, to broadcast information to large groups, etc. Social networks are also commonly used for dating and/or meeting people with similar interests.

Entities, for example, employers utilize a social network to gather information about a user that may not be apparent during short term interactions, for example, during an interview, but are necessary for the evaluation of the user by the entities. However, the social network is susceptible to incomplete, inaccurate, or incredible information of the user. Users can either knowingly or unknowingly provide inaccurate information to the social network, as there is a dearth of regulation of content on the internet. Moreover, it is often cumbersome to determine accuracy of the information provided by the user on the social network. Furthermore, the social network may not contain relevant information about a user that a requesting party, for example, a potential employer is seeking. Therefore, there is a need for a method and system that gathers or accesses accurate information about the user on the social network.

Moreover, there is a need for a method and system that evaluates the user for a specific purpose, for example, the user's employability for a job. There is also a need for consolidating information provided by the user across multiple social networks for a comprehensive evaluation of the user.

Furthermore, there is a need for users to receive objective feedback about themselves. Objective feedback helps the users to gain insight into how others really perceive their personality and skills. Users can also leverage the received feedback to improve on personal or professional shortcomings. Conventional feedback mechanisms received from friends, family, etc., often fall short, in that, they are not quantifiable, not continuous, and not shareable. Moreover, conventional feedback mechanisms do not allow a feedback provider to maintain his/her anonymity, thereby compelling the feedback provider to mostly provide positive feedback about the user. Often, negative feedback provides a platform to help users better themselves and can be used as a self-help tool. Therefore, there is a need for a method and system that enables provision of objective feedback comprising both positive feedback and negative feedback on personal and professional attributes of the users.

Therefore, there is a long felt but unresolved need for a computer implemented method and system that enables provision of quantifiable, credible, and anonymous feedback on a user associated with one or more social networks and also validates the user based on the user's social information and/or the feedback.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated needs for enabling provision of quantifiable, credible, and anonymous feedback on a user associated with one or more social networks, and validating the user based on the user's social information and/or feedback. A validation platform associated with and in communication with multiple social networks is provided. The validation platform identifies the user for validation from one or more of the social networks. As used herein, the term "validation" refers to determining authenticity of a user and the user's information in one or more social networks associated with the user for authenticating the user, for example, based on feedback on the user acquired from one or more social contacts of the user. The validation platform retrieves social information of the identified user from the social networks of the user. The social information of the user comprises, for example, relationship information of and between the identified user and the social contacts of the identified user on the social networks. The social contacts are associated with one or more of the social networks. The social information further comprises information about the user, for example, name of the user, sex, date of birth, etc., and any information about the user that is relevant for establishing or maintaining social relationships, for example, information on an alma mater, work experience, hobbies, etc. Moreover, the social information comprises, for example, messages, testimonials, feedback, etc., resulting from interactions between the users of the social networks.

The validation platform acquires feedback on the identified user from one or more social contacts of the user. In an embodiment, the validation platform selectively maintains anonymity of the acquired feedback from the social contacts. The validation platform generates one or more validation scores for the identified user based on the retrieved social information and/or the acquired feedback. As used herein, the term "validation scores" refers to one or more scores, for example, an evaluation score, a feedback authentication score, a user authentication score, a composite score, etc., determined or computed by the validation platform for validating the user. The generated validation scores enable validation of the user associated with the social networks.

In an embodiment, the generation of the validation scores comprises generating an evaluation score for the identified user based on the acquired feedback. The evaluation score quantifies the acquired feedback based on an evaluation of multiple attributes of the identified user by one or more social contacts of the user.

In another embodiment, the generation of the validation scores comprises generating a feedback authentication score for the acquired feedback on the identified user. The feedback authentication score quantifies authenticity of the acquired feedback based on feedback authentication criteria. The feedback authentication criteria comprise, for example, one or more of degrees of separation between the identified user and the social contacts, one or more validation scores of the social contacts, strength of relationship between the identified user and the social contacts, number of mutual social contacts between the identified user and the social contacts, duration of time that the identified user has been in a social relationship with the social contacts, number of feedback assessments completed by the social contacts, number of feedback assessments received by the social contacts, a ratio of positive feedback assessments to negative feedback assessments provided by the social contacts, etc.

In another embodiment, the validation platform generates a user authentication score for the identified user. The user authentication score quantifies authenticity of the identified user based on user authentication criteria. The user authentication criteria comprise, for example, one or more of duration of time that the identified user is associated with the social networks, level of activity of the identified user on the social networks such as number of messages sent and received by the user, the login frequency of the user, etc., number of social contacts of the identified user, one or more validation scores of the social contacts of the identified user, etc.

In another embodiment, the validation platform generates a composite score for the identified user based on a weighted combination of one or more of the evaluation score, the feedback authentication score, and the user authentication score.

In an embodiment, the validation platform processes a query about the user from a requesting party. As used herein, the term "requesting party" refers to an entity that requests for information about a user of one or more social networks from the validation platform for a specific purpose. The requesting party is, for example, a social contact, a business entity, a potential employer, a dating service, a roommate finding service, etc., that uses one or more of the validation scores of the user to learn more about the user and to determine the appropriateness of the user for a specific purpose. The validation platform receives the query from the requesting party for validating the user. The query comprises a request for one or more of the generated validation scores of the user and/or search criteria. The search criteria comprise, for example, a threshold validation score for the user, where the threshold validation score represents a minimum score acceptable to the requesting party. The search criteria further comprise differential weights for the evaluation score, the feedback authentication score, and/or the user authentication score combinable for generating the composite score.

In an embodiment, the validation platform receives differential weights from the user, the social contacts, and/or the requesting party for the generation of the validation scores. The validation platform determines the generated validation scores of the user and whether the generated validation scores satisfy the search criteria. The validation platform then transmits a response to the query to the requesting party based on the determination. In another embodiment, the validation platform generates a list of users associated with one or more of the social networks, who satisfy the search criteria of the requesting party.

In an embodiment, the validation platform retrieves the social information of the identified user by querying and compiling the social information of the identified user from multiple social networks, when the user is registered with multiple social networks. The validation platform then generates one or more validation scores for the identified user for each of the social networks. In another embodiment, the validation platform generates an aggregated social network profile for the identified user by aggregating the social information from multiple social network profiles of the identified user across multiple social networks. The aggregated social network profile is accessible, for example, through an interface on the validation platform or through one or more of the social networks. In another embodiment, the validation platform aggregates the validation scores of the identified user generated for each of the social networks of the identified user for generating one or more aggregate validation scores for the identified user for a holistic validation of the identified user.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

FIG. 8A exemplarily illustrates a template of a feedback form provided by the validation platform for acquiring feedback on the user from one or more social contacts of the user.

FIG. 8B exemplarily illustrates generation of an evaluation score for a user by the validation platform based on the acquired feedback.

FIG. 8C exemplarily illustrates generation of a feedback authentication score for the acquired feedback by the validation platform.

FIG. 8D exemplarily illustrates generation of a composite score for the user by the validation platform.

FIG. 9A exemplarily illustrates a query form provided by the validation platform to a requesting party, showing information required by the validation platform to identify and validate the user associated with a social network.

FIG. 9B exemplarily illustrates a response provided by the validation platform to a query received from the requesting party, on processing the query.

FIG. 9C exemplarily illustrates a notification transmitted to the user by the validation platform for obtaining consent of the user to release the retrieved social information and the determined composite score of the user to the requesting party.

FIG. 9D exemplarily illustrates the response of the user to the notification transmitted by the validation platform.

FIGS. 11A-11G exemplarily illustrate generation and updation of a user's social network profile by the validation platform based on feedback acquired from the user's social contacts, in the absence of a query from a requesting party.

DETAILED DESCRIPTION OF THE INVENTION

Figure 1:
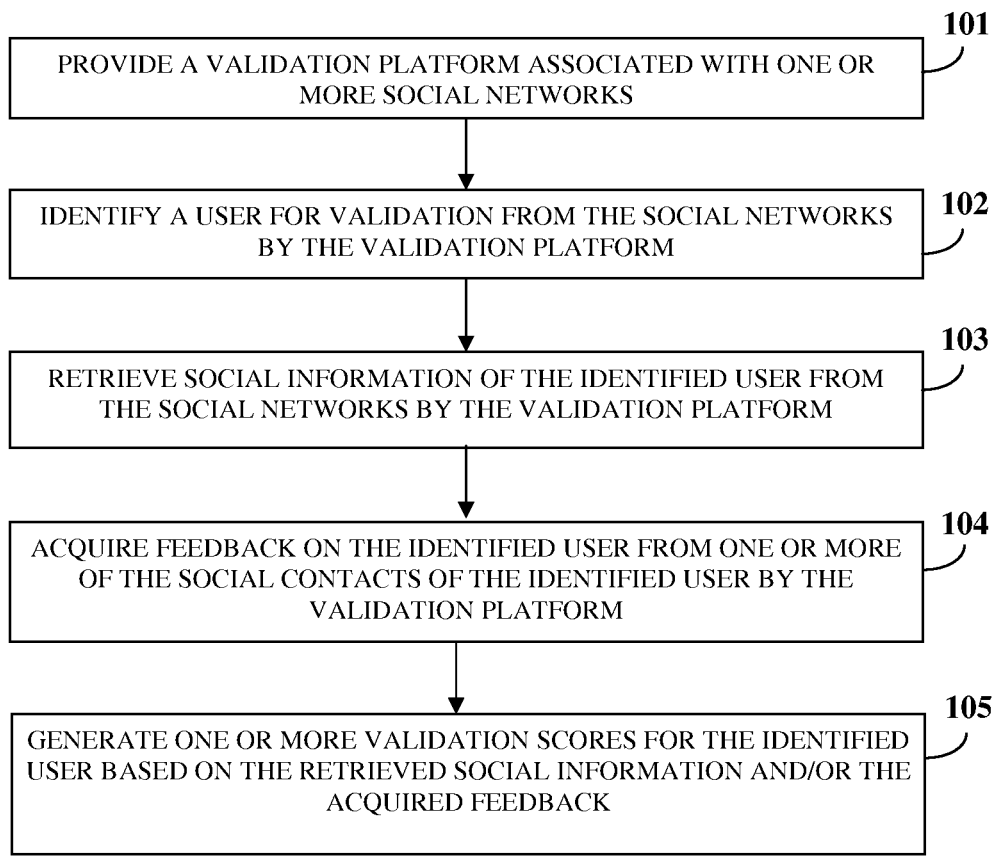
FIG. 1 illustrates a computer implemented method for validating a user associated with one or more social networks.

FIG. 1 illustrates a computer implemented method for validating a user associated with one or more social networks.

A validation platform associated with and in communication with the social networks is provided 101. A social network refers to an online platform that facilitates interaction and manages social relationships between users registered on the social network. The social network comprises, for example, a relationship-oriented, a business-oriented, an academic-oriented network of users, or any combination thereof. The users associated with the social networks are, for example, individuals, business entities, organizations, online services, etc. The social network builds, maintains, and reflects social relationships among the users and allows the users to exchange and share information. For purposes of illustration, the detailed description refers to validating a user associated with a single social network; however the scope of the computer implemented method and system disclosed herein is not limited to a single social network but may be extended to include one or more of multiple social networks of the user.

The validation platform identifies 102 the user for validation from the social networks. As used herein, the term "validation" refers to determining authenticity of the user and the user's information in one or more social networks associated with the user for authenticating the user, for example, based on feedback on the user acquired from one or more social contacts of the user. The validation platform then retrieves 103 social information of the identified user from the social networks. The social information of the identified user comprises, for example, relationship information of and between the identified user and social contacts of the identified user on the social networks, where the social contacts are associated with the social networks. Each of the social networks comprises, for example, multiple users, and stores social information about each of the users, and relationship information defining relationships between the users. As used herein, the term "social information" refers to information about the user comprising, for example, name of the user, sex, date of birth, etc., and any information about the user that is relevant for establishing and maintaining social relationships with other users of the social networks, for example, information on an alma mater, work experience, hobbies, etc. For example, the social information of the user comprises information provided in a profile of the user on each of the social networks. The social information further comprises, for example, information about different social relationships of the user with, for example, friends, a spouse, family, colleagues, etc., of the user. In an example, the social information of the user comprises, for example, the name of the user, contact information, a picture of the user, a resume of the user, education, work experience, skills, etc., as well as a list of other users that are in social relationships with the user, for example, students that were in the same fraternity as the user in college, etc. Furthermore, the social information comprises, for example, messages, testimonials, feedback, etc., resulting from interactions between the users of the social networks.

Each of the social networks focuses on building different types of social relationships among users, for example, friendships, professional relationships, etc. The social networks enable each of the users to create and maintain a profile, and to establish a network of social relationships with, for example, friends, colleagues, classmates, etc. Other users of the social network may be in a direct relationship or in an indirect relationship with the user. The other users who are in a direct relationship with the user form a part of the user's network of social relationships and are herein referred to as "social contacts" of the user. The social contacts of the user are also registered with the same social networks as that of the user. The user may have multiple social contacts and may share a different social relationship with each social contact. For example, the user may have multiple contacts such as a spouse, a neighbor, a co-worker, etc.

Other users who are not in a direct relationship with the user may be in an indirect relationship with the user. The user is considered to be in an indirect relationship with another user of a social network, if that other user does not form part of the inner circle of the user's contacts, but may be in a direct relationship or an indirect relationship with one or more social contacts of the user. For example, the user is considered to be indirectly connected to another user of the social network, when these users share a mutual social contact with each other but are not in a direct relationship with each other. In an example, user A is a social contact of user B, and user C is a social contact of user B. Therefore, user C is indirectly connected to user A because user B is a mutual social contact between user A and user C.

The social information further comprises a type of social relationship that the user shares with the user's direct social contacts and the user's indirect contacts. The social networks determine the degree of separation between the user and each of the direct social contacts and the indirect contacts of the user. The user and the social contacts are first degree contacts of each other. Users of the social network who share a mutual contact but are not in a direct relationship with each other are second degree contacts. In an example, user A and user C are not directly connected with each other, but share a mutual social contact, namely user B. Therefore, user A and user C are second degree contacts. In an embodiment, each of the social networks identifies other unrecognized relationships between the users. In an example, a social network determines that user C and user D are from the same geographic location, or graduated from the same university, although they are not connected.

The social networks enable the user to add to the user's network of social relationships by enabling the user to establish direct relationships and interact with other users. In an example, the user may introduce himself/herself to a second degree contact on a social network, a third degree contact on the social network, or an unconnected contact. The social networks maintain information about relationships between different users of the social networks. In an example, user A may identify user B of a social network Z as a former high school classmate, or a former colleague from a previous job. The social networks enable the user to identify more distant relationships, for example, a distant family member that has not kept in touch, users who share similar interests, etc.

The social networks enable the user to leverage the user's social relationships in interactions with other users. The social networks enable the user to search for information or potential contacts based on search criteria. The search criteria comprise, for example, name, sex, electronic mail (email) address, location, company affiliation, etc. The social network returns a list of contacts that satisfy the search criteria. In an example, the user finds potential contacts that the user is interested in pursuing a social relationship with, where the potential contacts may be unconnected to or indirectly connected to the user. The user can also search for all potential contacts in a geographic location who share a certain interest with the user. The user can further restrict the search based on a degree of separation between the user and each of the potential contacts. In an example, the user restricts the search with a requirement that the search results must only include potential contacts that are separated by at most three degrees of separation. The user then performs certain actions on the social network based on the user's intentions in executing the search. For example, the user may find potential contacts interested in online dating and then attempt to initiate dialogue with the potential contacts. In another example, the user may search for applicants for a job. In another example, the user may add a potential contact resulting from the search to the social network of the user, thereby listing the potential contact as a social contact of the user.

Figure 3:
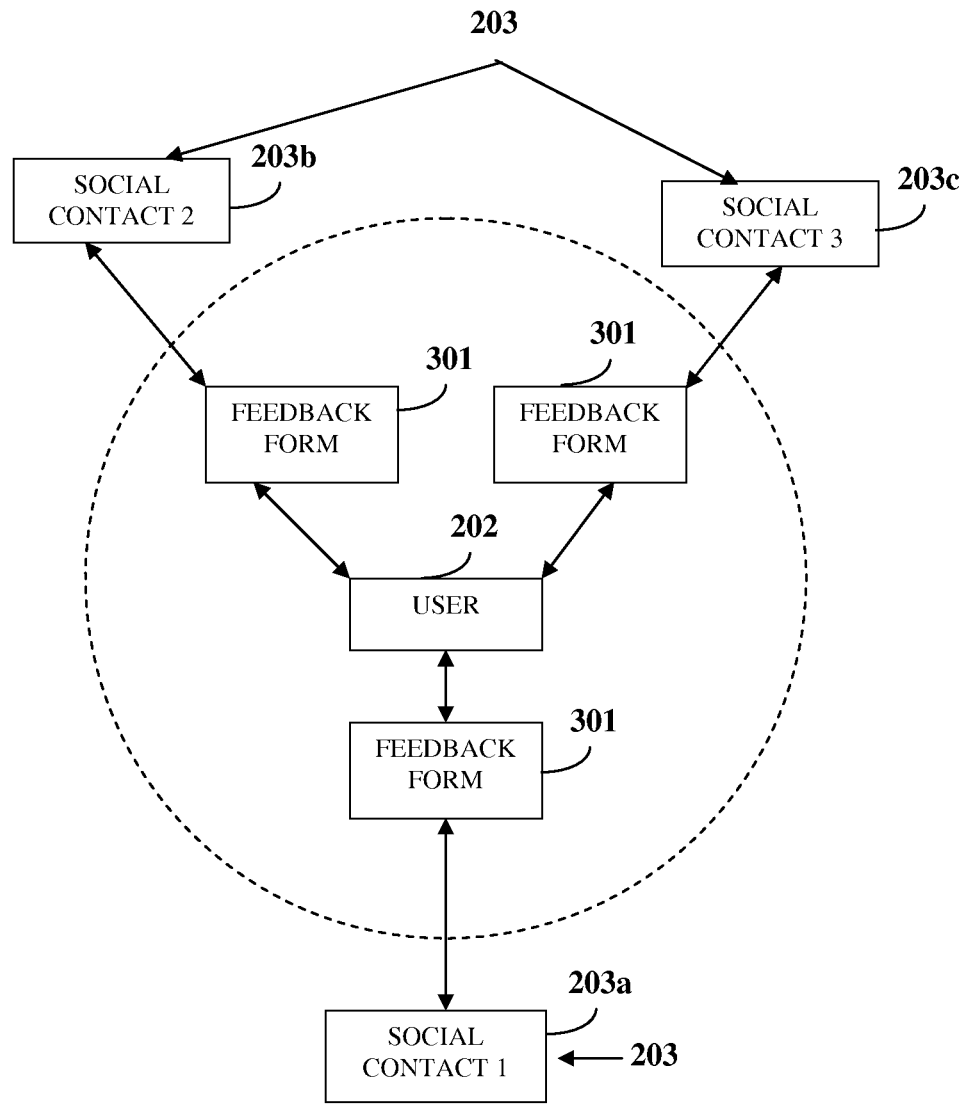
FIG. 3 exemplarily illustrates a block flow diagram for acquiring feedback on the user from social contacts of the user.

In the computer implemented method disclosed herein, the validation platform acquires 104 feedback on the identified user from one or more of the user's social contacts as disclosed in the detailed description of FIG. 3. The validation platform may acquire the feedback from the social contacts independent of queries from a requesting party or based on the requesting party's queries. The identified user may also select the social contacts in the social network to trigger requests for feedback from the social contacts. The acquired feedback is stored on the validation platform and can be retrieved whenever requested. The validation platform generates 105 one or more validation scores for the identified user based on the retrieved social information and/or the acquired feedback. As used herein, the term "validation scores" refers to one or more scores, for example, an evaluation score, a feedback authentication score, a user authentication score, a composite score, etc., determined or computed by the validation platform for validating the user. The generated validation scores enable validation of the user associated with one or more social networks.

In an embodiment, the generation of one or more of the validation scores for the identified user comprises generating an evaluation score for the identified user based on the feedback acquired from one or more of the user's social contacts. The evaluation score quantifies the acquired feedback based on an evaluation of multiple attributes of the identified user by each of the social contacts as disclosed in the detailed description of FIGS. 8A-8B. The attributes refer to characteristics of the user, for example, intellectual capability, analytical ability, integrity, work ethic, sense of humor, friendliness, leadership skills, etc. In an embodiment, the validation platform defines weights for each of the attributes. The validation platform computes, for example, an attribute score for each of the attributes for the user, and generates the evaluation score based on a weight assigned to each attribute score.

In an embodiment, the social contacts submit their feedback assessments using one or more feedback templates defined by the validation platform and represented in one or more feedback forms. A feedback form comprises closed-ended questions and open-ended questions. The closed-ended questions refer to questions, for example, multiple choice questions, true/false questions, etc., that may be answered definitively by selecting a response from an answer set by the user's social contacts. The open-ended questions refer to questions that accept free-form text input from the social contacts. That is, the social contacts can provide additional feedback on the user by typing text in the feedback form. The validation platform assigns an attribute score for each attribute addressed in the feedback form.

In an embodiment, the validation platform factors the responses to the open-ended questions from the social contacts into the evaluation score of the user. In another embodiment, the validation platform does not factor the responses to open-ended questions from the social contacts into the evaluation score of the user. In an example, the validation platform provides the social contacts an option for adjusting the evaluation score of the user based on their feedback on the user.

Consider an example where the validation platform provides a social contact with an option for adjusting the user's evaluation score based on the social contact's responses to the open-ended questions in the feedback form after completion of providing the feedback on the user. The social contact may choose to accept or deny adjusting the evaluation score of the user based on the responses to the open-ended questions. In an example, if the social contact chooses to adjust the evaluation score of the user based on the responses to the open-ended questions, the validation platform limits the amount of adjustment the social contact can make to the evaluation score of the user. In another example, where the social contact chooses to adjust the evaluation score of the user based on the responses to the open-ended questions, the validation platform requests an independent administrator who is considered neutral to both the user and the social contact to review the responses to the open-ended questions provided by the social contact. The validation platform then makes an adjustment to the evaluation score, if necessary, depending on the nature of the responses to the open-ended questions and the degree to which the responses to the open-ended questions are addressed in the responses to the closed-ended questions.

In another embodiment, the validation platform enables the social contacts to define and/or modify the feedback form. In another embodiment, the validation platform provides a time limit to the social contacts for completing the feedback assessments. For example, the validation platform places a time limit of thirty days for a feedback assessment, within which the social contact must complete the feedback assessment. In another example, the validation platform allows the user requesting the feedback from one or more social contacts to define the time limit for completion of the feedback.

In another embodiment, the validation platform uses behavior of the social contacts, for example, number of previous feedback assessments completed, amount of time taken to complete previous feedback assessments, number of missed feedback assessments, a validation score, an evaluation score, a user authentication score, etc., for assigning the time limit for completion of the feedback assessment. For example, the validation platform assigns more time for completing feedback assessments to a social contact who has completed all previous feedback assessments sent to him/her on time than to a social contact who has missed completing half of the feedback assessments on time.

In another embodiment, the validation platform selectively maintains anonymity of the feedback acquired from the social contacts. For example, when a social contact responds to an open-ended question, the validation platform does not allow the user to view the response to the open-ended question provided by the social contact. In some cases, the validation platform allows the user to access the social contact's responses to the open-ended questions. In another example, the responses to the open-ended questions provided in the completed feedback form are presented in a random order for keeping the responses anonymous.

In another embodiment, the generation of one or more of the validation scores for the identified user comprises generating a feedback authentication score for the acquired feedback on the identified user. The feedback authentication score quantifies authenticity of the acquired feedback based on feedback authentication criteria. The feedback authentication criteria comprise, for example, one or more of degrees of separation between the identified user and the social contacts, one or more validation scores of the social contacts, strength of relationship between the identified user and the social contacts, number of mutual social contacts between the identified user and the social contacts, duration of time that the identified user has been in a social relationship with the social contacts, number of feedback assessments completed by the social contacts, number of feedback assessments received by the social contacts, and a ratio of positive feedback assessments to negative feedback assessments provided by the social contacts. The feedback authentication score determines the authenticity of a relationship between the identified user and the social contact who provides the feedback. In an embodiment, the validation platform uses the feedback authentication score of each of the social contacts to weigh the feedback received from the social contacts.

Consider an example where user P and contact Q have been first degree contacts for a period of ten years and have over one hundred mutual contacts, as compared to user P and contact R who have been first degree contacts for only two months and have ten mutual contacts with each other. The validation platform gives the feedback on user P provided by contact Q, who has been a first degree contact of user P for ten years and has over one hundred mutual social contacts with user P, more weight than the feedback on user P provided by contact R, who has been a first degree contact of user P for only two months and has only ten mutual social contacts with user P. In this example, the validation platform considers the relationship between user P and contact Q to be more authentic than the relationship between user P and contact R, and therefore provides a higher feedback authentication score for the feedback acquired from contact Q than for the feedback acquired from contact R.

The validation platform also considers the type of feedback the social contact provides over a period of time. Consider an example where the validation platform determines that a social contact provides only positive feedback to all the users, resulting in a high ratio of positive feedback to negative feedback. The validation platform does not weigh the feedback acquired from this social contact as heavily as the feedback acquired from another social contact who provides a more balanced feedback. In an embodiment, the validation platform acquires all the feedback assessments in privacy to encourage objective feedback from the social contacts. The validation platform maintains anonymity of feedback provided by the social contacts. The validation platform allows the user to view the feedback without revealing the identity of the social contacts who provided the feedback.

The validation platform also considers other factors, for example, number of feedback assessments received by the user's social contact, the number of feedback assessments completed by the user's social contact, the length of time that the social contact has been registered with the user's social network, etc., to influence the generation of the feedback authentication score.

In another embodiment, the generation of one or more of the validation scores for the identified user comprises generating a user authentication score for the identified user. The user authentication score quantifies authenticity of the identified user based on user authentication criteria. The user authentication criteria comprise, for example, one or more of duration of time that the identified user is associated or registered with the social networks, level of activity of the identified user within the social networks, number of social contacts of the identified user, one or more validation scores of the social contacts of the identified user, etc. In an embodiment, the validation platform also considers the user authentication scores of the user's social contacts for generating the user authentication score for the identified user. In another embodiment, the validation platform adjusts the user authentication score of the user based on strength of the relationship of the user with each of the social contacts.

In another embodiment, the generation of one or more of the validation scores for the identified user comprises generating a composite score for the identified user, for example, based on a weighted combination of one or more of the evaluation score, the feedback authentication score, and the user authentication score.

Consider an example where a user A has a composite score of 80 before receiving feedback from a contact B and a contact C. The validation platform then generates evaluation scores of 90 and 70 based on the feedback acquired from contact B and contact C respectively. If the feedback authentication scores of contact B and contact C are not considered in generating the composite score, user A's composite score remains unchanged as the net effect of the evaluation scores based on the feedback from contact B and contact C is nil. However, if the feedback authentication scores are taken into account for generating the composite score, the net effective composite score of user A may change. Consider an example where user A has received feedback from contact B and contact C. User A shares more mutual contacts with contact B than with contact C. Therefore, the feedback authentication score of contact B, who is considered a more authentic contact of user A, is higher than the feedback authentication score of contact C. This results in the evaluation score based on the feedback of contact B having a higher impact on user A's composite score than that of the evaluation score based on the feedback of contact C, thereby increasing the composite score of user A.

Consider another example, where user A is registered with a social network for about ten years, has multiple social contacts, and uses the social network frequently. In contrast, a spamming service may create a user account on the social network for spamming other users of the social network with content. The spamming service is registered with the social network for a short period of time, for example, two weeks, has very few contacts, and has only logged on to the social network once to send a mass spam advertisement. The validation platform provides a higher user authentication score to user A than to the spamming service, as the validation platform considers user A to be more authentic than the spamming service. Consequently, the composite score of user A, which may be dependent on the user authentication score of the user, is adjusted to be higher than the composite score of the spamming service. For example, if user A and the spamming service have identical evaluation scores before factoring in their user authentication scores to generate their respective composite scores, user A may end up with a higher composite score than the spamming service after factoring in the user authentication scores of user A and the spamming service.

Consider another example where the validation platform considers the user authentication scores of user P's first degree contacts when generating the user authentication score for user P. User P may have two first degree contacts, contact Q and contact R. Depending on the relationship that user P shares with contacts Q and R, the effect of the user authentication score of contact Q on the user authentication score of user P is different from the effect of the user authentication score of contact R on the user authentication score of user P.

The validation platform predefines the weights for each one of the validation scores, that is, for the evaluation score, for the feedback authentication score, and for the user authentication score. The composite score refers to the weighted combination of one or more of the evaluation score, the feedback authentication score, and the user authentication score. In an example, the user authentication score and the evaluation score is weighted equally for generating the composite score. In another example, the validation platform generates the composite score based on the following weighted combination: 50% of the evaluation score, 20% of the feedback authentication score, and 30% of the user authentication score.

In an embodiment, the validation scores are dynamic and remain valid as long as the user is registered on the social networks affiliated with the validation platform. Consider an example where the user has a composite score of 50, through 10 acquired feedback assessments from the user's social contacts. The composite score of 50 remains valid until the validation platform acquires another feedback assessment on the user. In an example, the $11^{th}$ acquired feedback assessment on the user modifies the composite score of the user to 60, after which 60 becomes the composite score for the user and continues to be valid until the validation platform acquires another feedback assessment. If no other feedback assessments are received from that point forward, 60 remains the valid composite score for the user.

In another embodiment, the validation platform receives differential weights assigned to one or more of the evaluation score, the feedback authentication score, and the user authentication score from, for example, the users of the social network, the social contacts of the users, the social network, a requesting party, etc., for generating the composite score. For example, a requesting party such as a recruiting firm who requests for the composite score of the user may require that 90% of the composite score be derived from the evaluation score and 10% of the composite score be derived from the feedback authentication score. In an embodiment, the composite score of the user may entirely correspond to the evaluation score.

Figure 4:
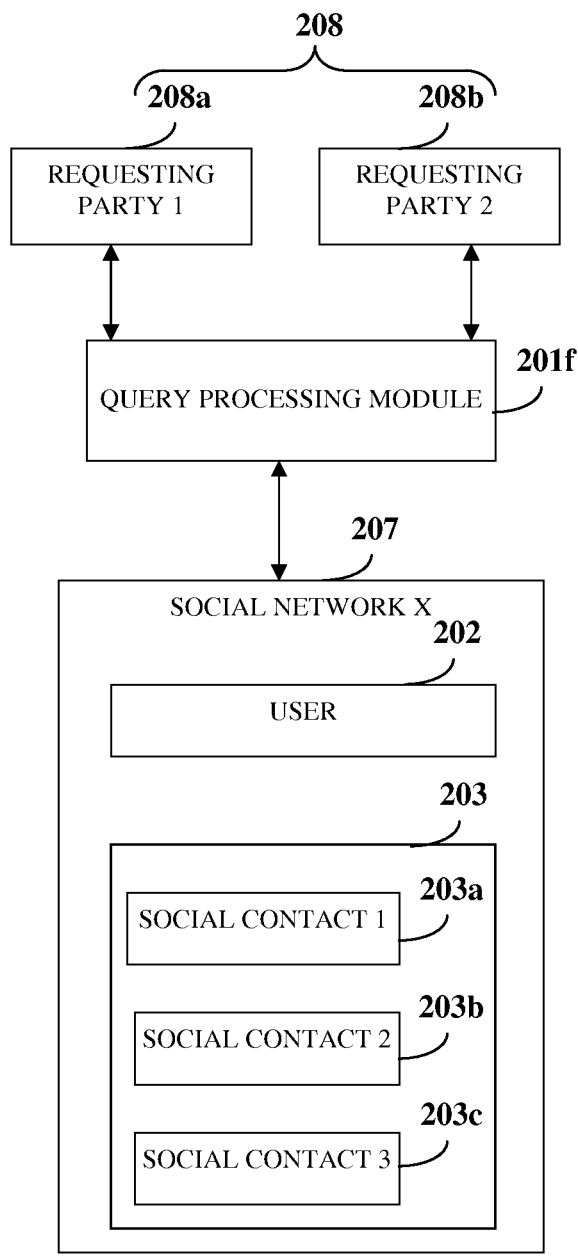
FIG. 4 exemplarily illustrates a block flow diagram for validating a user associated with one or more social networks for a requesting party.

In another embodiment, the validation platform processes a query about the user from a requesting party as disclosed in the detailed description of FIG. 4. As used herein, the term "requesting party" refers to an entity that requests for information, for example, the validation scores of a user associated with one or more social networks from the validation platform. The requesting party is, for example, the user, the social contacts of the user, a business entity, a potential employer, a dating service, a roommate finding service, etc., who use one or more of the validation scores of the user to determine the appropriateness of the user for a specific purpose. In an example, a potential employer uses one or more of the validation scores of the user to determine if the user is qualified for a job. In another example, a dating service uses one or more of the validation scores to determine if the user is a suitable match for another user's dating interests. In another example, the requesting party requests the validation platform for feedback on the user acquired from the social contacts of the user. In another embodiment, the validation platform generates a list of users associated with the social networks who satisfy search criteria, for example, particular job skills, etc., received from the requesting party.

In an embodiment, the validation platform enables the user to search the social networks for potential contacts. The validation platform searches for potential contacts based on objective criteria, for example, a validation score associated with a potential contact to enhance the quality of the search results.

In another embodiment, the validation platform retrieves social information of the identified user by querying and compiling social information of the identified user from multiple social networks, when the user is registered with multiple social networks. The validation platform then generates the validation scores for each of the social networks associated with the user.

In another embodiment, the validation platform generates an aggregated social network profile for the identified user by aggregating the social information of the identified user from multiple social network profiles of the identified user across multiple social networks. The aggregated social network profile is accessible, for example, through an interface on the validation platform or through one or more of the social networks.

In another embodiment, the validation platform aggregates the validation scores generated for each of the social networks of the identified user for generating one or more aggregate validation scores for the identified user. The aggregate validation scores provide for a holistic validation of the identified user. In an example, the validation platform aggregates multiple evaluation scores generated from feedback assessments provided by multiple social contacts into a single evaluation score.

Figure 2:
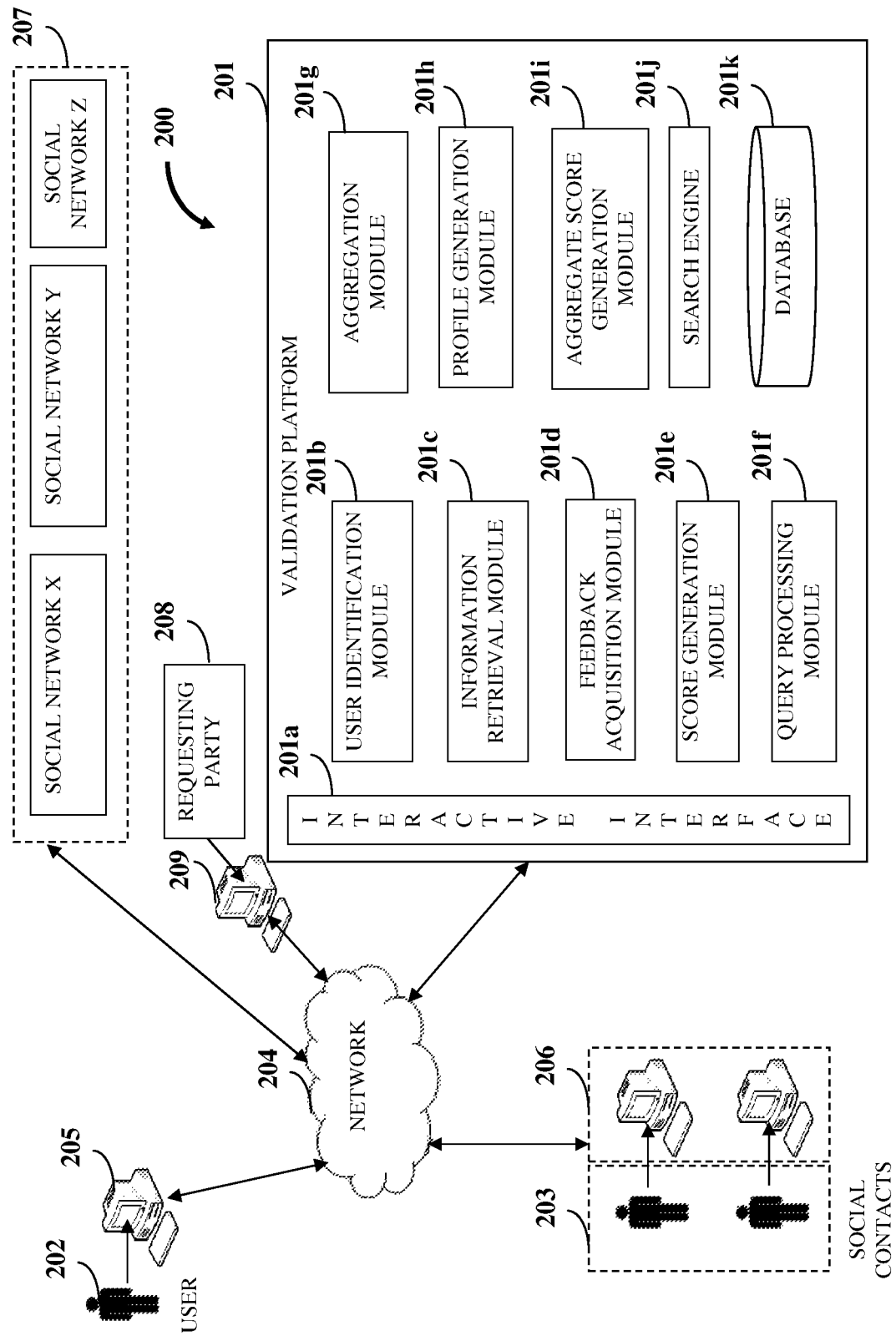
FIG. 2 illustrates a computer implemented system for validating a user associated with one or more social networks.

FIG. 2 illustrates a computer implemented system 200 for validating a user 202 associated with one or more social networks 207. The computer implemented system 200 disclosed herein comprises a validation platform 201 hosted, for example, on an online server, associated and in communication with the social networks 207, for example, social network X, social network Y, social network Z, etc., via a network 204. The user 202, the social contacts 203, and a requesting party 208 access the validation platform 201 using communication devices 205, 206, and 209 respectively via the network 204, for example, the internet. The communication devices 205, 206, and 209 are, for example, personal computers, laptops, mobile phones, personal digital assistants, tablet computers, mobile devices, and other communication devices. The validation platform 201 comprises an interactive interface 201a, a user identification module 201b, an information retrieval module 201c, a feedback acquisition module 201d, a score generation module 201e, a query processing module 201f, an aggregation module 201g, a profile generation module 201h, an aggregate score generation module 201i, a search engine 201j, and a database 201k. In an embodiment, the validation platform 201 is an independent platform accessible by the user 202, the social contacts 203, the requesting party 208, and the social networks 207 via the network 204. In another embodiment, the validation platform 201 is an integral component of the social networks 207.

The validation platform 201 provides the interactive interface 201a to the user 202, the social contacts 203, and the requesting party 208. The interactive interface 201a is a front end of the validation platform 201, which comprises, for example, a web portal hosted by the validation platform 201. The interactive interface 201a is accessible to the user 202, the social contacts 203, and the requesting party 208, for example, via the world wide web. The interactive interface 201a provides a consolidated view into multiple social networks 207 and is configured to receive updates of events and activities from the social networks 207. In an embodiment, the interactive interface 201a is an existing front-end interface of one of the social networks 207, with the addition of one or more controls and widgets for accessing elements and components of the computer implemented method and system 200 disclosed herein. The modules, for example, 201b, 201c, 201d, 201e, 201f, 201g, 201h, 201i, 201j, and 201k of the validation platform 201 constitute a back end of the validation platform 201, which is accessible, for example, to administrators of the validation platform 201.

The user identification module 201b identifies the user 202 for validation from one or more social networks 207. For example, when a requesting party 208 sends a query to the validation platform 201 for a user 202 with a particular job skill, the user identification module 201b analyzes social information of each of the users 202 registered with multiple social networks 207 associated with the validation platform 201 and identifies the users 202 with the particular job skill. The user identification module 201b then generates a list of users 202 with the particular job skill from multiple social networks 207 associated with the validation platform 201 and transmits the list to the requesting party 208 via the network 204. In an embodiment, the user identification module 201b identifies relevant social contacts 203 of the user 202 across multiple social networks 207 for acquiring more relevant feedback on the user 202.

The information retrieval module 201c retrieves social information comprising, for example, relationship information of and between the identified user 202 and the social contacts 203 of the identified user 202, from the social networks 207. In an embodiment, where the user 202 is registered with multiple social networks 207, the information retrieval module 201c queries and compiles social information of the user 202 from multiple social networks 207. The feedback acquisition module 201d acquires feedback on the identified user 202 from one or more of the social contacts 203 registered with the social networks 207. In an embodiment, the feedback acquisition module 201d selectively maintains anonymity of the acquired feedback from the social contacts 203.

The score generation module 201e generates one or more validation scores for the identified user 202 based on the retrieved social information and/or the acquired feedback. The generated validation scores enable the validation of the identified user 202 associated with the social networks 207. In an embodiment, the score generation module 201e generates an evaluation score for the identified user 202 based on the acquired feedback, where the evaluation score quantifies the acquired feedback based on an evaluation of multiple attributes of the identified user 202 by each of the social contacts 203 as disclosed in the detailed description of FIG. 1.

In another embodiment, the score generation module 201e generates a feedback authentication score for the acquired feedback, where the feedback authentication score quantifies authenticity of the acquired feedback based on feedback authentication criteria comprising, for example, one or more of degrees of separation between the identified user 202 and the social contacts 203, one or more validation scores of the social contacts 203, strength of relationship between the identified user 202 and the social contacts 203, number of mutual social contacts 203 between the identified user 202 and the social contacts 203, duration of time that the identified user 202 has been in a social relationship with the social contacts 203, number of feedback assessments completed by the social contacts 203, number of feedback assessments received by the social contacts 203, a ratio of positive feedback assessments to negative feedback assessments provided by the social contacts 203, etc., as disclosed in the detailed description of FIG. 1.

In another embodiment, the score generation module 201e generates a user authentication score for the identified user 202, where the user authentication score quantifies authenticity of the identified user 202 based on user authentication criteria comprising, for example, one or more of duration of time that the identified user 202 is associated or registered with the social networks 207, level of activity of the identified user 202 within the social networks 207 such as number of messages sent and received by the identified user 202, the login frequency of the identified user 202, etc., number of social contacts 203 of the identified user 202, one or more validation scores of the social contacts 203 of the identified user 202, etc., as disclosed in the detailed description of FIG. 1. In another embodiment, the score generation module 201e generates a composite score for the identified user 202 based on a weighted combination of one or more of the evaluation score, the feedback authentication score, and the user authentication score. The score generation module 201e receives differential weights from the user 202, one or more social contacts 203, and the requesting party 208 for the generation of one or more of the validation scores.

The query processing module 201f of the validation platform 201 processes a query about the user 202 from the requesting party 208. The query processing module 201f receives the query from the requesting party 208 for validating the user 202. The query comprises, for example, a request for one or more of the generated validation scores of the user 202 and search criteria. The search criteria comprise, for example, a threshold validation score for the user 202, where the threshold validation score represents a minimum score acceptable to the requesting party 208. The search criteria further comprise differential weights for one or more of the evaluation score, the feedback authentication score, and the user authentication score combinable for generating the composite score. The query processing module 201f determines the generated validation scores of the user 202 and whether the generated validation scores satisfy the search criteria. The query processing module 201f then transmits a response to the query to the requesting party 208 based on the determination via the network 204. In an example, when the requesting party 208 sends a query to the validation platform 201 for one or more of the user's 202 validations scores, the query processing module 201f transmits a response comprising the requested validation scores to the requesting party 208 via the network 204. In an embodiment, the query processing module 201f, in communication with the user identification module 201b, generates a list of users 202 registered with the social networks 207 who satisfy the search criteria of the requesting party 208 and transmits the list to the requesting party 208 via the network 204.

The aggregation module 201g of the validation platform 201 aggregates the social information of the identified user 202 from multiple social network profiles of the identified user 202 across multiple social networks 207, when the user 202 is registered with multiple social networks 207. In an embodiment, the aggregation module 201g enables one of the social networks 207 associated with the user 202 to aggregate social information of the user 202 from the other social networks 207.

The user 202 may use one of the social networks 207 as a portal to access the other social networks 207 associated with the user 202. In an example, the user 202 is registered with social network X, social network Y, and social network Z. The aggregation module 201g may allow the user 202 to use social network X to access social network Y and social network Z. The user 202 may then view the user's 202 social contacts 203 in each of the three social networks 207 via an interface of social network X. Moreover, the aggregation module 201g enables the user 202 to carry out other functions across the social networks 207, for example, the user 202 may send messages, view profiles of the user's 202 social contacts 203, and add new social contacts 203 across the social networks 207. Furthermore, the aggregation module 201g enables the user 202 or the requesting party 208 to use one of the social networks 207 to solicit feedback from the social contacts 203 and submit feedback for the social contacts 203 associated with any of the social networks 207.

The profile generation module 201h generates a profile for the user 202 based on the retrieved social information, acquired feedback, and/or the generated validation scores. In an embodiment, the profile generation module 201h, in communication with the aggregation module 201g, generates an aggregated social network profile for the identified user 202 using the aggregated social information. In an embodiment, the user 202 can view an aggregated social network profile through, for example, an interface of any one of the social networks 207 that is included in the aggregation. In an example, a user 202 of social network X, social network Y, and social network Z may use social network X to access all three of the social networks 207 via an interface of social network X 207. In another embodiment, the user 202 can view the aggregated social network profile through the interactive interface 201a of the validation platform 201.

The aggregate score generation module 201i of the validation platform 201 generates one or more aggregate validation scores for the identified user 202 by aggregating one or more validation scores generated for each of the social networks 207 of the identified user 202 for a holistic validation of the identified user 202. In an example, the aggregate score generation module 201i computes an aggregate user authentication score for the user 202 using the user authentication scores of the user 202 from multiple social networks 207. The aggregate score generation module 201i calculates the aggregate user authentication score of the user 202, for example, by averaging the user authentication scores of the user 202 from the different social networks 207. In an embodiment, the aggregate score generation module 201i assigns a different weight to each of the user authentication scores of the user 202 from different social networks 207 for calculating the aggregate authentication score of the user 202.

The search engine 201j enables the user 202 to search for information or potential contacts based on search criteria. The database 201k stores social information of the user 202 and the generated validation scores, for example, the evaluation score, the feedback authentication score, the user authentication score, the aggregate validation scores, etc. The database 201k also stores for example, the social information of the users 202 of the social network 207, the acquired feedback assessments, the validation scores of the users 202 and the social contacts 203, the generated profiles of the user 202, etc. The database 201k is, for example, a relational database comprising multiple tables for storing the social information of the user 202, the generated validation scores, the acquired feedback, etc.

FIG. 3 exemplarily illustrates a block flow diagram for acquiring feedback on the user 202 from the social contacts 203 of the user 202. The validation platform 201, as exemplarily illustrated in FIG. 2, provides a feedback form 301 as disclosed in the detailed description of FIG. 1 and FIG. 8A, to the social contacts 203, namely, social contact 1 203a, social contact 2 203b, and social contact 3 203c for providing feedback on the user 202.

In an embodiment, the validation platform 201 masks or protects the identity of the social contacts 203 who submit the feedback for the user 202 by limiting their visibility to the user 202. Although the feedback provided by the social contacts 203 is made available to the user 202 and influences the user's 202 composite score, based on an algorithm that takes into account several factors comprising, for example, the evaluation score and the user authentication score, the validation platform 201 may not disclose the identity of the social contacts 203. Therefore, the validation platform 201 preserves the integrity of the feedback since the user 202 cannot determine which of the social contacts 203 has provided non-positive feedback.

In another embodiment, the validation platform 201 withholds both the identity of the social contact 203 and the actual feedback assessment itself from the user 202. That is, the validation platform 201 limits the disclosure to the user 202 who requested for the feedback and only intimates that a feedback was provided.

Consider an example where social contact 1 203a submits feedback for the user 202. The validation platform 201 adjusts the composite score of the user 202 based on the evaluation score and the feedback authentication score generated for the feedback provided by social contact 1 203a. The user 202 may view the feedback that is provided by social contact 1 203a, but may not ascertain that social contact 1 203a provided the feedback. In another example, the user 202 is intimated that social contact 1 203a provided the feedback; but is kept unaware of the nature of the feedback that was provided.

In an embodiment, the validation platform 201 enables the social contacts 203 to provide the feedback even without the requesting party 208 submitting a request for the validation scores, etc. That is, the social contacts 203 may provide the feedback out of their own initiative. In another embodiment, the validation platform 201 only allows the social contacts 203 to provide feedback if the social contacts 203 are a part of the user's 202 network of social relationships, for example, the inner circle of direct social contacts 203. In yet another embodiment, the validation platform 201 allows the social contacts 203 to provide feedback only if the social contacts 203 share a particular type of social relationship, for example, co-worker, spouse, etc., with the user 202. In an example, social contact 2 203b can provide a feedback to the user 202, only if social contact 2 203b is a co-worker of the user 202. In another embodiment, the validation platform 201 allows the social contacts 203 to provide feedback to the user 202, only after being associated with the user 202 for a certain period of time. In another embodiment, the validation platform 201 allows the social contacts 203 to provide feedback for the user 202, only after the social contacts 203 receive requests for feedback from the user 202.

In another embodiment, the validation platform 201 identifies relevant social contacts 203 of the user 202 across multiple social networks 207 for acquiring more relevant feedback on the user 202. The validation platform 201 analyzes the user's 202 social information and performs a search for relevant social contacts 203 across multiple social networks 207. In an example, the validation platform 201 identifies the user's 202 former manager and the user's 202 ex-colleagues based on a former company name provided by the user 202 for acquiring feedback on the user's 202 work ethic, professionalism, etc.

FIG. 4 exemplarily illustrates a block flow diagram for validating a user 202 association with one or more social networks 207 for a requesting party 208, for example, requesting party 1 208a and/or requesting party 2 208b. The validation platform 201 determines whether the user 202 is a qualified user 202 for the requesting party 208 on receiving a query from the requesting party 208 for validating the user 202. The query comprises, for example, a request for the generated validation scores of the user 202 and/or search criteria. The search criteria comprise, for example, a threshold validation score for the user 202, where the threshold validation score represents a minimum score acceptable to the requesting party 208. The search criteria further comprise differential weights for one or more of the evaluation score, the feedback authentication score, and the user authentication score combinable for generating the composite score. The validation platform 201 determines the generated validation scores of the user 202 and determines whether the generated validation scores of the user 202 satisfy the search criteria.

The validation platform 201 then transmits a response to the query to the requesting party 208 based on the determination via the network 204.

The requesting party 208, for example, an employer, a dating service, a roommate finding service, etc., may request the validation platform 201 for one or more of the generated validation scores of the user 202 in order to gain insight about the user 202 from the perspective of the social contacts 203, for example, 203a, 203b, and 203c of the user 202. The requesting party 208 may include users 202 of the social networks 207, or may be granted access to the social networks 207 as third parties. The requesting party 208 may also request the validation platform 201 for information on the validation scores such as the user authentication score, the evaluation score, the attribute scores, the composite score, number of feedback assessments provided for the user 202, etc. For example, employers can target candidates for a job based on their validation scores. In an example, requesting party 1 208a requests for an intellectual capability score of the user 202. In another example, a requesting party 2 208b requests for the number of social contacts 203 who provided feedback for the user 202. In another example, requesting party 2 208b requests for the feedback authentication scores for each of the social contacts 203, namely, social contact 1 203a, social contact 2 203b, and social contact 3 203c.

Consider an example where a user 202 applies for a job opening advertised by requesting party 1 208a. Requesting party 1 208a queries the validation platform 201 for one or more of the validation scores of the user 202. Requesting party 1 208a may use the interactive interface 201a of the validation platform 201 or an interface of the social network 207 to query the validation platform 201. The query processing module 201f of the validation platform 201 processes the query and transmits a response to requesting party 1 208a. Requesting party 1 208a receives the validation scores of the user 202 only if the user 202 consents to providing the validation scores to requesting party 1 208a. In an embodiment, the validation platform 201 requests consent from the user 202 before sending the validation scores to requesting party 1 208a. The user 202 may consent to providing the validation scores to requesting party 1 208a without knowing the actual validation scores.

Consider an example where requesting party 2 208b requests the validation score of the user 202 associated with social network X. The validation platform 201 associated with social network X notifies the user 202 of the request and enquires the user 202 for instructions on how the request should be handled. The user 202 consents to providing the user's 202 validation score requested by requesting party 2 208b. The user 202 may also deny access to the information requested by the requesting party 2 208b.

In another example, the validation platform 201 receives a query from the requesting party 208 for retrieving a list of one or more users 202 of the social network 207 that match the search criteria of the requesting party 208. In an embodiment, the validation platform 201 provides a list of unique identifiers of the users 202 satisfying the search criteria, but not the names of the users 202. In another embodiment, the validation platform 201 provides a list of the users 202 who satisfy the search criteria. In an embodiment, other aspects of the user 202 that are stored in the social network profile of the user 202 may be used to assess the user 202 from a third party perspective, in addition to one or more of the generated validation scores, for example, the evaluation score, the user authentication score, etc., number of feedback assessments received, etc. These aspects comprise, for example, location, educational background, work experience, employer, industry of employment, number of social contacts 203 of the user 202, etc. Accordingly, the queries made by the requesting party 208 may also comprise a variety of search criteria in addition to the request for the validation scores of the user 202, for example, the past and present employer of the user 202, work experience of the user 202, etc. For example, requesting party 1 208a may request the validation platform 201 for a list of users 202 who work in the financial services industry, have at least ten years of work experience, and fall in the top 25 percentile with regard to their validation scores.

Consider an example where a requesting party 208 such as a firm in the financial services industry is conducting a targeted search for new employees. The firm submits a query to the validation platform 201 to identify all the users 202 that match one or more of the following search criteria, for example, a composite score above 75, an evaluation score above 80, more than 5 feedback assessments or evaluations completed, lives in Boston, went to an Ivy League school, over 5 years of work experience, currently works for XYZ Bank, works in the financial services industry, and has over 200 first degree contacts. The validation platform 201 on receiving the query compiles the validation scores and the required social information of all the users 202 of the social networks 207 and generates and processes a list of users 202 who satisfy the search criteria of the firm. The validation platform 201 then provides the processed list of users 202 to the firm.

In another embodiment, the validation platform 201 enables the requesting party 208 to request information from the social networks 207 or about the user 202 who is registered on another social network 207.

Consider an example where a requesting party 208 such as a firm sends a request for a validation score, for example, a composite score of the user 202 and the validation platform 201 requests the user 202 to authorize the release of the validation score to the firm. Depending on the validation score of the candidate, the firm may choose whether or not to interview the user 202, thereby making a more informed decision than they would have made without access to the validation score.

Consider another example where a recruiting agency utilizes the validation scores of users 202 of a social network 207 when conducting a broad search for interviewing suitable candidates. The recruiting agency requests the validation platform 201 for a list of users 202 with validation scores within a target range. The validation platform 201 requests the users 202 to authorize release of the validation scores to the recruiting agency. The recruiting agency then prioritizes the users 202 based on how their validation scores fall within the target range, thereby reducing resources required to identify ideal candidates.

Consider another example where a dating website requests for the validation score of the user 202. The dating website can include the user's 202 validation score in the profile of the user 202 in order to provide an additional data point for viewers of the user's 202 profile. Therefore, a viewer can decide whether or not to further pursue a relationship with the user 202 based on the validation score which reflects how the user's 202 friends, family, and other acquaintances regard the user's 202 personality and skills. In an embodiment, the dating website may request the user 202 to authorize release of one or more validation scores stored on the validation platform 201 to the dating website, on registration of the user 202 with the dating website. The validation scores may therefore be utilized in any situation where the user 202 needs to be assessed and validated.

Figure 5:
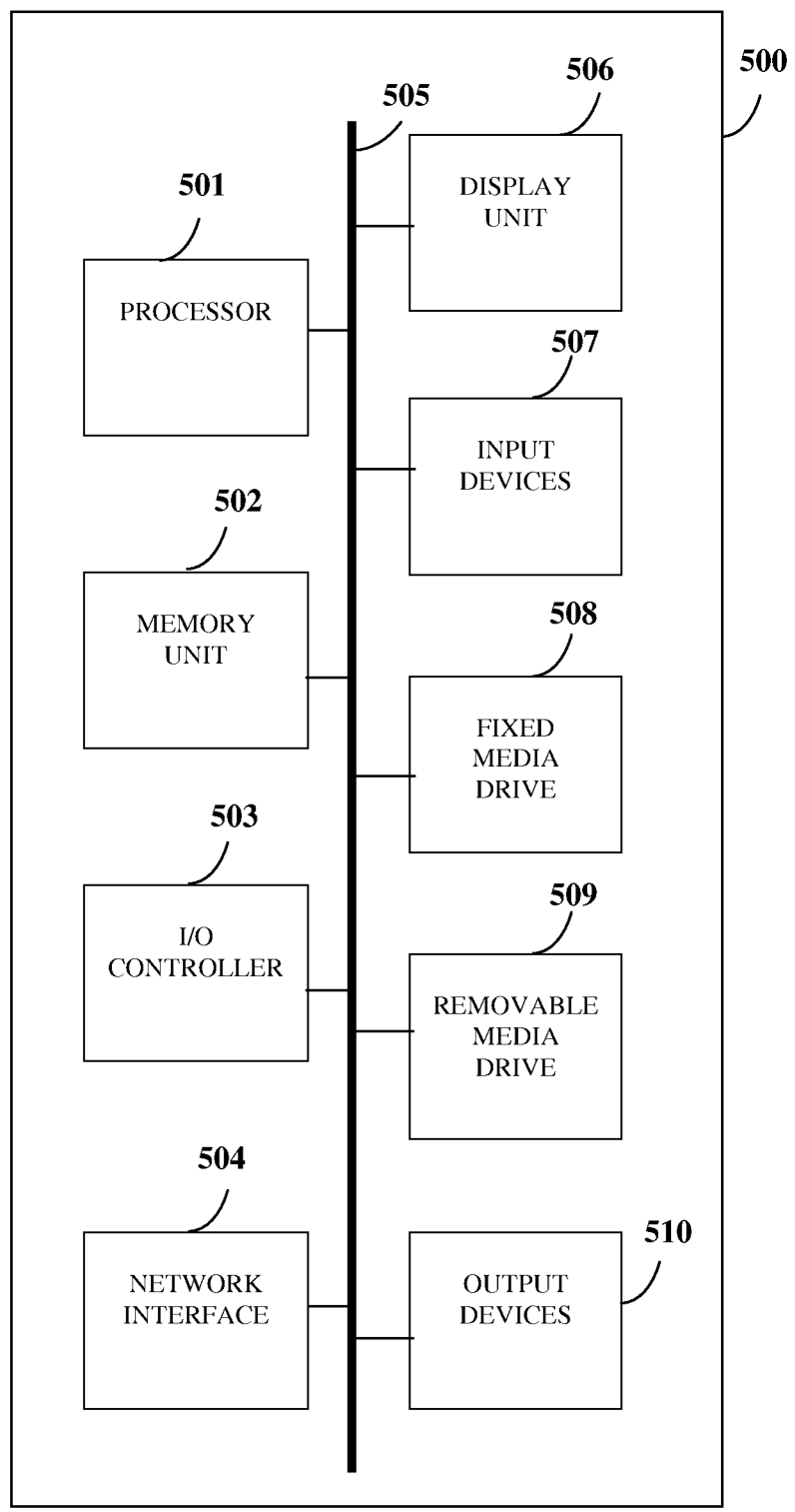
FIG. 5 exemplarily illustrates the architecture of a computer system employed by a validation platform for validating a user associated with one or more social networks.

FIG. 5 exemplarily illustrates the architecture of a computer system 500 employed by the validation platform 201 for validating a user 202 associated with one or more social networks 207. The computer system 500 comprises, for example, a processor 501, a memory unit 502 for storing programs and data, an input/output (I/O) controller 503, a network interface 504, a data bus 505, a display unit 506, input devices 507, output devices 510, etc.

The processor 501 is an electronic circuit that executes computer programs. The memory unit 502 stores programs, applications, and data. The memory unit 502 is, for example, a random access memory (RAM) or another type of dynamic storage device that stores information and instructions for execution by the processor 501. The memory unit 502 also stores temporary variables and other intermediate information used during execution of the instructions by the processor 501. The computer system 500 further comprises a read only memory (ROM) or another type of static storage device that stores static information and instructions for the processor 501. The network interface 504 enables connection of the computer system 500 to the network 204. The network 204 is, for example, a local area network (LAN), a wide area network, a mobile communication network, etc. The computer system 500 of the validation platform 201 communicates, for example, with the communication devices 205, 206, and 209 of the user 202, the social contacts 203, and the requesting party 208 respectively, through the network interface 504. The network interface 504 comprises, for example, an infrared (IR) interface, a WiFi interface, a universal serial bus interface (USB), a local area network (LAN), a wide area network (WAN) interface, etc. The I/O controller 503 controls the input and output actions performed, for example, by administrators of the validation platform 201. The data bus 505 permits communication between the modules, for example, 201b, 201c, 201d, 201e, 201f, 201g, 201h, 201i, 201j, and 201k of the validation platform 201.

The display unit 506 displays, via the interactive interface 201a, the actions computed by the validation platform 201 to the user 202, the social contacts 203, and the requesting party 208. The input devices 507 are used for inputting data into the computer system 500. The input devices 507 are, for example, a keyboard such as an alphanumeric keyboard, a joystick, a mouse, a touch pad, a light pen, etc. The output devices 510 output the results of the actions computed by the validation platform 201, for example, to the administrators of the validation platform 201.

The computer system 500 further comprises a fixed media drive 508 and a removable media drive 509 for receiving removable media. Computer applications and programs are used for operating the computer system 500. The programs are loaded onto the fixed media drive 508 and into the memory unit 502 of the computer system 500 via the removable media drive 509. In an embodiment, the computer applications and programs may be loaded directly via the network 204. Computer applications and programs are executed by double clicking a related icon displayed on the display unit 506 using one of the input devices 507. The user 202, the social contacts 203, and the requesting party 208 interact with the computer system 500 of the validation platform 201 using the interactive interface 201a.

The computer system 500 of the validation platform 201 employs an operating system for performing multiple tasks. The operating system is responsible for management and coordination of activities and sharing of resources of the computer system 500. The operating system further manages security of the computer system 500, peripheral devices connected to the computer system 500, and network connections. The operating system recognizes keyboard inputs and pointing device inputs of an administrator, output display, files, and directories stored locally on the fixed media drive 508. The operating system on the computer system 500 executes different programs, for example, a web browser, an electronic mail (email) application, etc., initiated by the administrators of the validation platform 201 using the processor 501. The operating system monitors the use of the processor 501. The processor 501 retrieves the instructions for executing the modules, for example, 201b, 201c, 201d, 201e, 201f, 201g, 201h, 201i, 201j, and 201k of the validation platform 201 from the program memory in the form of signals. A program counter determines the location of the instructions in the program memory. The program counter stores a number that identifies the current position in the program of the modules, for example, 201b, 201c, 201d, 201e, 201f, 201g, 201h, 201i, 201j, and 201k of the validation platform 201.

The instructions fetched by the processor 501 from the program memory after being processed are decoded. The instructions are placed in an instruction register (IR) in the processor 501. After processing and decoding, the processor 501 executes the instructions. For example, the user identification module 201b defines instructions for identifying a user 202 for validation from one or more social networks 207. The information retrieval module 201c defines instructions for retrieving social information of the identified user 202 from the social networks 207. The feedback acquisition module 201d defines instructions for acquiring feedback on the identified user 202 from one or more social contacts 203 registered with the social networks 207. The score generation module 201e defines instructions for generating one or more validation scores, for example, the evaluation score, the feedback authentication score, the user authentication score, the composite score, etc., for the identified user 202 based on the retrieved social information and/or the acquired feedback. The query processing module 201f defines instructions for processing a query about the user 202 from the requesting party 208. The profile generation module 201h defines instructions for generating a profile for the user 202 based on the retrieved social information, the acquired feedback, and/or the generated validation scores. The aggregation module 201g defines instructions for aggregating the social information of the identified user 202 from multiple social network profiles of the identified user 202 across multiple social networks 207. The profile generation module 201h, in communication with the aggregation module 201g, defines instructions for generating an aggregated social network profile for the identified user 202 based on the aggregated social information. The aggregate score generation module 201i defines instructions for generating one or more aggregate validation scores for the identified user 202 by aggregating the validation scores of the user 202 generated for each of the social networks 207 with which the user 202 is registered. The search engine 201j defines instructions for enabling searching for social information, validation scores, etc., of the user 202.

The processor 501 of the validation platform 201 retrieves the instructions defined by the user identification module 201b, the information retrieval module 201c, the feedback acquisition module 201d, the score generation module 201e, the query processing module 201f, the aggregation module 201g, the profile generation module 201h, the aggregate score generation module 201i, and the search engine 201j, and executes the instructions.

At the time of execution, the instructions stored in the instruction register are examined to determine the operations to be performed. The operations include arithmetic and logic operations. The processor 501 then performs the specified operation. The operating system performs multiple routines for performing a number of tasks required to assign the input devices 507, the output devices 510, and memory for execution of the modules, for example, 201b, 201c, 201d, 201e, 201f, 201g, 201h, 201i, 201j, and 201k of the validation platform 201. The tasks performed by the operating system comprise assigning memory to the modules, for example, 201b, 201c, 201d, 201e, 201f, 201g, 201h, 201i, 201j, and 201k of the validation platform 201, moving data between the memory unit 502 and disk units and handling input/output operations. The operating system performs the tasks on request by the operations and after performing the tasks, the operating system transfers the execution control back to the processor 501. The processor 501 continues the execution to obtain one or more outputs. The outputs of the execution of the modules, for example, 201b, 201c, 201d, 201e, 201f, 201g, 201h, 201i, 201j, and 201k of the validation platform 201 are displayed, for example, to the administrators of the validation platform 201, the user 202, the social contacts 203, and the requesting party 208 using the interactive interface 201a.

Disclosed herein also is a computer program product comprising computer executable instructions embodied in a non-transitory computer readable storage medium. As used herein, the term "non-transitory computer readable storage medium" refers to all computer readable media, for example, non-volatile media such as optical disks or magnetic disks, volatile media such as a register memory, processor cache, etc., and transmission media such as wires that constitute a system bus coupled to the processor 501, except for a transitory, propagating signal.

The computer program product disclosed herein comprises one or more computer program codes for validating the user 202 associated with one or more social networks 207. For example, the computer program product disclosed herein comprises a first computer program code for identifying a user 202 for validation from one or more social networks 207, a second computer program code for retrieving social information of the identified user 202 from the social networks 207, a third computer program code for acquiring feedback on the identified user 202 from one or more social contacts 203 associated with the social networks 207, a fourth computer program code for generating one or more validation scores for the identified user 202 based on the retrieved social information and/or the acquired feedback.

The computer program product disclosed herein further comprises, for example, a fifth computer program code for generating an evaluation score for the identified user 202 based on the acquired feedback, a sixth computer program code for generating a feedback authentication score for the acquired feedback based on the feedback authentication criteria, a seventh computer program code for generating a user authentication score for the identified user 202 based on the user authentication criteria, and an eighth computer program code for generating a composite score for the identified user 202 based on a weighted combination of one or more of the evaluation score, the feedback authentication score, and the user authentication score. The computer program product disclosed herein further comprises additional computer program codes for performing additional steps that may be required and contemplated for validating a user 202 registered on one or more social networks 207.

The computer program codes comprising the computer executable instructions for validating a user 202 registered on one or more social networks 207 are embodied on the non-transitory computer readable storage medium. The processor 501 of the computer system 500 retrieves these computer executable instructions and executes them. When the computer executable instructions are executed by the processor 501, the computer executable instructions cause the processor 501 to perform the method steps for validating a user 202 registered with the social networks 207. In an embodiment, a single piece of computer program code comprising computer executable instructions performs one or more steps of the computer implemented method disclosed herein for validating a user 202 associated with one or more social networks 207.

For purposes of illustration, the detailed description refers to the validation platform 201 being run locally on a computer system 500; however the scope of the computer implemented method and system 200 disclosed herein is not limited to the validation platform 201 being run locally on the computer system 500 via the operating system and the processor 501, but may be extended to run remotely over the network 204 by employing a web browser and a remote server, a mobile device, or other electronic devices.

Figure 6:
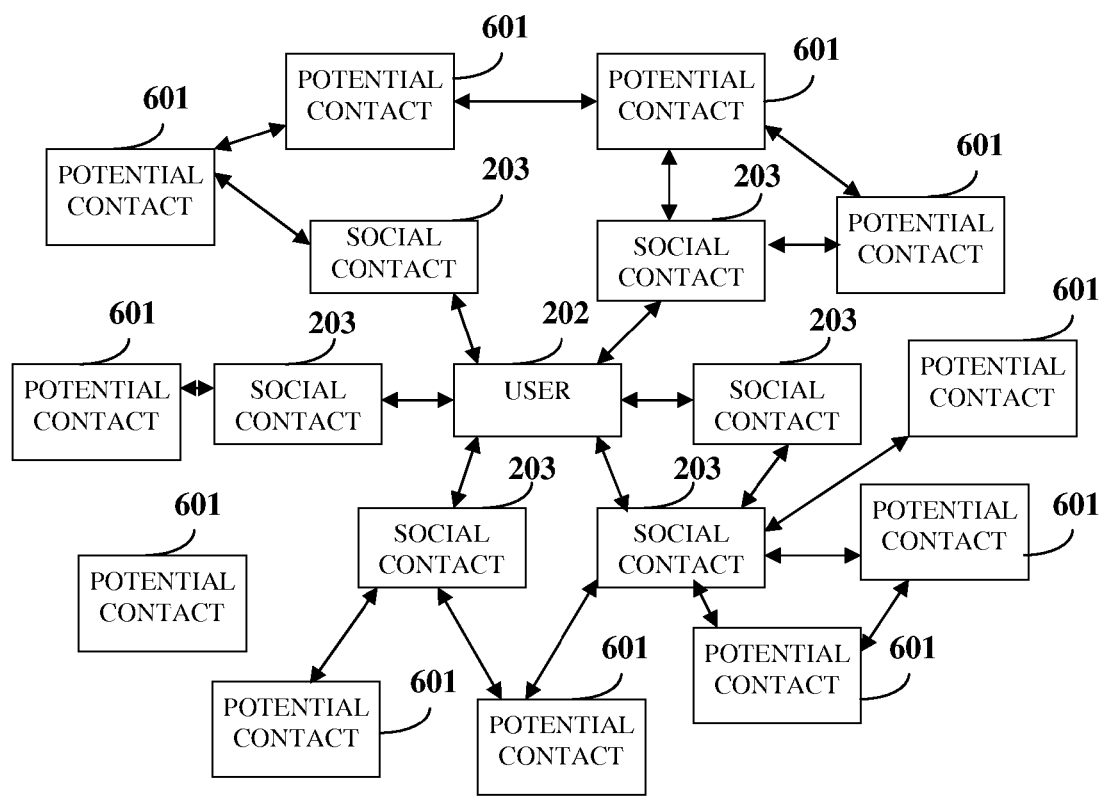
FIG. 6 exemplarily illustrates a network of social relationships of the user.

FIG. 6 exemplarily illustrates a network of social relationships of the user 202. The social network 207 comprises social contacts 203 and potential contacts 601 of the user 202 associated with the social network 207. The social contacts 203 are other users of the social network 207 who are in direct relationship with the user 202. The potential contacts 601 are users of the social network 207 who are not yet directly connected with the user 202, but are either unconnected to the user 202 or are indirectly connected to the user 202 through the social contacts 203. The potential contact 601 who is indirectly connected with the user 202, may share a mutual social contact 203 with the user 202. The user 202 can use the social network 207 to identify potential contacts 601 from the indirectly connected users in the social network 207. The user 202 can engage in new social relationships with the potential contacts 601 based on common interests, experiences, etc. For example, a user 202 can determine from the social network 207 that a potential contact 601 that is not directly connected to the user 202 shares a mutual social contact 203 with the user 202, and that the two users 202 and 601 are both interested in a local sports team. The two indirectly connected users 202 and 601 can choose to engage in a social relationship, so that they are now directly connected and listed as social contacts 203 of each other. The social contacts 203 provide feedback on the user 202 for enabling the validation platform 201 to generate one or more validation scores for the user 202 that are used for validating the user 202 as disclosed in the detailed description of FIG. 1 and FIGS. 3-4.

Figure 7:
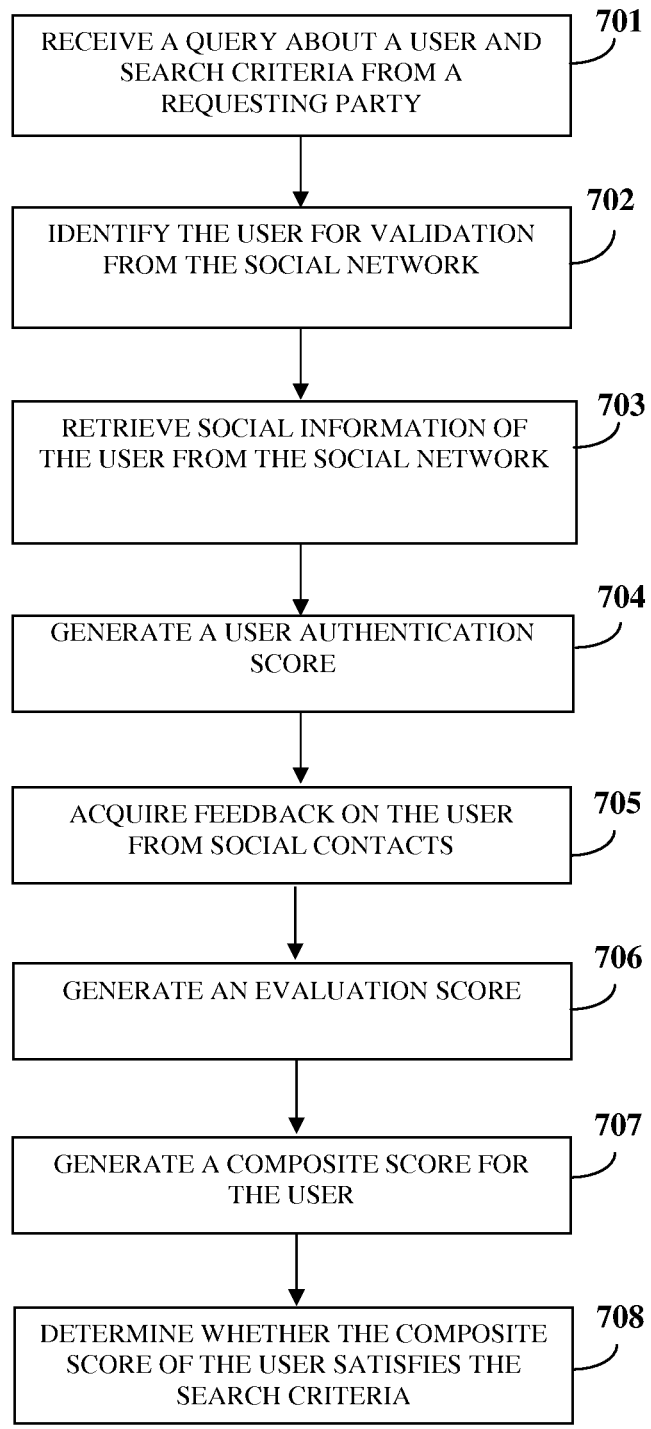
FIG. 7 exemplarily illustrates a flowchart comprising the steps for validating a user of a social network for a requesting party.

FIG. 7 exemplarily illustrates a flowchart comprising the steps for validating a user 202 for a requesting party 208. Consider an example where the validation platform 201 receives 701 a query about a user 202 registered on, for example, social network Y, from a requesting party 208, for example, an employer. The validation platform 201 also receives 701 the search criteria that determine, for example, employability of the user 202 for a position in sales from the employer. The validation platform 201 identifies 702 the user 202, registered on social network Y. The validation platform 201 then retrieves 703 social information of the user 202, comprising, for example, the name of the user 202, educational qualifications, work experience, recommendations, etc., from social network Y. The validation platform 201 also retrieves information such as the login frequency of the user 202, the length of time that the user 202 has been registered on social network Y, number of social contacts 203, number of second degree contacts, etc., from social network Y. The validation platform 201 generates 704 the user authentication score of the user 202 based on the retrieved information.

The validation platform 201 transmits a feedback form 301 to one or more of the social contacts 203 of the user 202, requesting the social contacts 203 for feedback on the user 202. In this example, the feedback form 301 comprises objective feedback questions on attributes such as the intellectual capability of the user 202, work-ethics of the user 202, ability of the user 202 to sell a product, likeability of the user 202, etc. The validation platform 201 acquires 705 the feedback on the user 202 provided by the social contacts 203. The validation platform 201 generates 706 the evaluation score based on the feedback provided by the social contacts 203. The validation platform 201 may also acquire feedback on the identified user 202 from the social contacts 203 of the identified user 202, prior to receipt of the query from the requesting party 208 and store the acquired feedback in the database 201k of the validation platform 201. The requesting party 208 may request for a new composite score to be calculated, for example, using the previous composite score, the evaluation score, and the user authentication score.

The validation platform 201 then generates 707 a composite score based on a weighted combination of the user authentication score and the evaluation score. In this example, the validation platform 201 gives an equal weight to the user authentication score and the evaluation score. The validation platform 201 then compares the composite score of the user 202 to the search criteria provided by the employer for determining 708 whether the composite score of the user 202 satisfies the search criteria, that is, to determine whether or not the user 202 would make a good salesperson. The validation platform 201 may also generate one or more of the validation scores, for example, the user authentication score, the evaluation score, the composite score, etc., prior to receipt of the query from the requesting party 208 and store the generated validation scores in the database 201k. The validation platform 201 may then retrieve the validation scores requested by the requesting party 208 from the database 201k and render the retrieved validation scores to the requesting party 208, for example, on the interactive interface 201a provided by the validation platform 201.

FIGS. 8A-8D exemplarily illustrate generation of validation scores, for example, an evaluation score, a feedback authentication score, and a composite score for a user 202. FIG. 8A exemplarily illustrates a template of a feedback form 301 provided by the validation platform 201 for acquiring feedback on the user 202 from one or more social contacts 203 of the user 202. Consider an example where the validation platform 201 provides the feedback form 301 exemplarily illustrated in FIG. 8A for gauging employability of the user 202. The feedback form 301 comprises, for example, a list of closed-ended questions comprising attributes of the user 202 and a five-point rating system that rates each of the attributes in a scale ranging from "strong" to "weak". The rating "strong" refers to an objective selection on the five-point rating system where the social contact 203 considers the user 202 to be particularly strong in a particular attribute. The rating "weak" refers to a rating on the five-point rating system where the social contact 203 considers the user 202 to be weak in a particular attribute. Each of the three ratings between "strong" and "weak" serves as an intermediate gradient between the two extreme ratings to evaluate the user 202. The validation platform 201 assigns attribute scores or points, for example, 1, 0.8, 0.6, 0.4, and 0.2 for each selection in the five-point rating system as exemplarily illustrated in FIG. 8B; where 1 corresponds to "strong" 0.2 corresponds to "weak" and the attribute scores 0.8, 0.6, and 0.4 correspond to intermediate ratings.

In this example, the attributes in the feedback form 301 defined by the validation platform 201 are divided into three main categories such as soft skills, technical skills, and leadership skills. The attributes that fall under the category of soft skills comprise, for example, communication skills, friendliness, integrity, dependability, loyalty, self confidence, positive attitude, motivation, professionalism, and work ethic. The attributes that fall under the category of technical skills comprise, for example, analytical ability, problem solving skills, research skills, and computer literacy. The attributes that fall under the category of leadership skills comprise, for example, people management skills, team building ability, teamwork, planning skills, and organizing skills.

Consider an example where the validation platform 201 provides the feedback form 301 to a social contact 203, Tom, for providing feedback on the user 202, Roger. Tom is a first degree contact of Roger. FIG. 8B exemplarily illustrates generation of the evaluation score for the user 202, Roger, by the validation platform 201 based on the acquired feedback in the feedback form 301. The validation platform 201 assigns attribute scores or points to the attributes in the soft skills category of the feedback form 301 based on Tom's feedback as follows: 0.4 for communication skills, 0.2 for friendliness, 0.8 for integrity, 0.4 for dependability, 0.2 for loyalty, 0.4 for self confidence, 1 for positive attitude, 1 for motivation, 1 for professionalism, and 0.4 for work ethic. The validation platform 201 assigns attribute scores or points to the attributes in the technical skills category of the feedback form 301 based on Tom's feedback as follows: 0.2 for analytical ability, 0.4 for problem solving ability, 1 for research skills, and 0.4 for computer literacy. The validation platform 201 assigns attribute scores or points to the attributes in the leadership skills category of the feedback form 301 based on Tom's feedback as follows: 0.6 for people management skills, 0.2 for teambuilding ability, 1 for teamwork, 1 for planning skills, and 1 for organizing skills.

The validation platform 201 then assigns weights for each of the attributes, depending on the importance of the attribute to the employability of the user 202. The weights assigned by the validation platform 201 for the attributes in the feedback form 301 are as follows: 10 for communication skills, 5 for friendliness, 10 for integrity, 5 for dependability, 5 for loyalty, 5 for self confidence, 5 for positive attitude, 5 for motivation, 2.5 for professionalism, 5 for work ethic, 10 for analytical ability, 5 for problem solving skills, 2.5 for research skills, 5 for computer literacy, 5 for people management skills, 5 for team building ability, 5 for teamwork, 2.5 for planning skills, and 2.5 for organizing skills.

The validation platform 201 computes the weighted score for each of the attributes by computing a product of the attribute score assigned to an attribute and the corresponding weight assigned for the attribute. The computed weighted score for each of the attributes, based on the feedback provided by Tom is as follows: 4 for communication skills, 1 for friendliness, 8 for integrity, 2 for dependability, 1 for loyalty, 2 for self confidence, 5 for positive attitude, 5 for motivated, 2.5 for professionalism, 2 for work ethic, 2 for analytical ability, 2 for problem solving skills, 2.5 for research skills, 2 for computer literacy, 3 for people management skills, 1 for team building ability, 5 for teamwork, 2.5 for planning skills, and 2.5 for organizing skills.

The validation platform 201 generates the evaluation score by computing the percentage of the sum of the weighted scores relative to a maximum possible score. The maximum possible score refers to the sum of the weighted scores when the attribute score for each of the attributes is 1. In this example, the sum of the weighted score is 55 and the maximum possible score is 100. Therefore, the evaluation score for Roger is 55%.

FIG. 8C exemplarily illustrates generation of a feedback authentication score for the acquired feedback by the validation platform 201. The validation platform 201 generates the feedback authentication score for the feedback acquired from the social contacts 203 based on feedback authentication criteria. That is, the validation platform 201 determines the authenticity of the social contacts 203 who provided the feedback. The feedback authentication criteria, in this example, comprise degree of separation of the social contact 203 Tom with the user 202 Roger, number of mutual social contacts 203 of the social contact 203 with the user 202, number of years that the social contact 203 has been in the user's 202 social network 207, number of feedback assessments completed by the social contact 203, and number of feedback assessments received by the social contact 203. The validation platform 201 acquires information for the feedback authentication criteria from the retrieved social information of the user 202 and/or the social contact 203. From the social information of Roger and/or Tom, the validation platform 201 determines information or results for the feedback authentication criteria as follows: the degree of separation of Tom with Roger is 1, the number of mutual social contacts 203 between Roger and Tom is 48, the number of years that Tom has been in Roger's social network 207 is 3, the number of feedback assessments completed by Tom is 15, and number of feedback assessments received by Tom is 5.

The validation platform 201 computes a translated score for each of the feedback authentication criteria. The translated score simplifies the calculation of the feedback authentication score. The validation platform 201 determines the translated score by assigning a score that is less than or equal to each one of the feedback authentication criteria. For example, the validation platform 201 determines the translated score as 1 when the degree of separation with the user 202 is 1 and 0.5 when degree of separation with the user 202 is 2. Moreover, for the feedback authentication criteria-"number of mutual social contacts with the user", the validation platform 201 assigns a translated score as follows: 1 for the number of mutual social contacts 203 with the user 202 greater than 40; 0.8 for the number of mutual social contacts 203 with the user 202 between 40 and 30; 0.6 for the number of mutual social contacts 203 with the user 202 between 30 and 20, etc. Similarly, the validation platform 201 assigns a translated score for the "number of years in the user's social network", "number of feedback assessments completed", and "number of feedback assessments received". In this example, the validation platform 201 assigns a translated score for each of the feedback authentication criteria as follows: 1 for the degree of separation with the user 202, 1 for the number of mutual social contacts 203 with the user 202, 0.8 for the number of years in Roger's social network 207, 0.8 for the number of feedback assessments completed by Tom, and 0.4 for the number of feedback assessments received by Tom.

Moreover, the validation platform 201 assigns weights for each of the feedback authentication criteria. The weights assigned for the feedback authentication criteria are, for example, 30 for degree of separation with the user 202, 25 for number of mutual social contacts 203 with the user 202, 25 for number of years in the user's 202 social network 207, 10 for number of feedback assessments completed, and 10 for number of feedback assessments received. The validation platform 201 then computes the weighted score as the product of the translated score of the feedback authentication criterion and the weight of the corresponding feedback authentication criterion. The computed weighted score for each of the feedback authentication criteria are as follows: 30 for degree of separation with the user 202, 25 for number of mutual social contacts 203 with the user 202, 20 for number of years in the user's 202 social network 207, 8 for number of feedback assessments completed by the social contact 203, and 4 for number of feedback assessments received by the social contact 203.

The validation platform 201 generates the feedback authentication score for the feedback acquired from Tom, for example, by computing the percentage of the sum of the weighted scores relative to a maximum possible score. The maximum possible score refers to the sum of the weighted scores when the translated score of each of the feedback authentication criteria is 1. In this example, the sum of the weighted score is 87 and the maximum possible score is 100. Therefore, the feedback authentication score for the acquired feedback is 87%.

FIG. 8D exemplarily illustrates generation of a composite score for the user 202 by the validation platform 201. In this example, the composite score is the weighted sum of the evaluation score and the feedback authentication score. The validation platform 201 assigns the weights for the evaluation score and the feedback authentication score as 70 and 30 respectively. The validation platform 201 then computes weighted scores for both the evaluation score and the feedback authentication score. The weighted score is the product of the respective score and the corresponding weight. That is, the weighted score for the evaluation score is 55% *70=38; and the weighted score for the feedback authentication score is 87% *30=26. The validation platform 201 then generates the composite score for the user 202. In this example, the composite score for Roger is the percentage of the sum of the weighted score relative to a maximum possible score. The sum of the weighted score is 64 and the maximum possible score is 100. Therefore, the composite score for the user 202 is expressed as a percentage, that is, is 64%. A requesting party 208 requests the validation platform 201 for the composite score of the user 202 and uses this composite score, for example, as one of the factors in gauging the employability of the user 202.

FIG. 9A exemplarily illustrates a query form provided by the validation platform 201 to a requesting party 208, showing information required by the validation platform 201 to identify and validate the user 202 associated with a social network 207. The query form, for example, requests the following details from the requesting party 208: name of the user 202, electronic mail (email) address of the user 202, the validation scores of the user 202, the weights to be assigned to each score, and the reason for the query. The attributes in the query form are, for example, the composite score, the evaluation score, the user authentication score, etc. In an example, the requesting party 208 selects the composite score of the user 202 to be queried and opts to assign the default weights to the evaluation score and the user authentication score. The default weights assigned to the evaluation score and the user authentication score are 70% and 30% respectively. The validation platform 201 provides the options, for example, candidate for employment, registered on a dating website, etc., as reasons for the query. In this example, the requesting party 208 selects the option "candidate for employment" to generate the query about the user 202 for gauging the employability of the user 202 for a particular job.

FIG. 9B exemplarily illustrates a response provided by the validation platform 201 to the query from the requesting party 208, on processing the query. The response comprises the retrieved social information and the determined composite score of the user 202. In this example, the validation platform 201 processes the received query and responds as follows: Name: John Doe, Sex: Male; Age: 35; # of social networks 207:1; # of first degree contacts: 115; # of second degree contacts: 450; # of third degree contacts: 1400; List of first degree contacts: Jane Doe, Jack Jones, . . . ; List of second degree contacts: Bill Bellamy, Jason Smith, . . . ; List of third degree contacts: Faith Adams, Jessica Stevens, . . . ; # of feedback assessments received: 18; # of feedback assessments completed: 22; Average evaluation score: 85; Evaluation score weight: 70%; Average user authentication score: 77; User authentication score weight: 30%; and Composite score: 83.

FIG. 9C exemplarily illustrates a notification transmitted to the user 202 by the validation platform 201 for obtaining consent of the user 202 to release the retrieved social information and the determined composite score of the user 202 to the requesting party 208. The notification message notifies the user 202 that a requesting party 208 has requested for the social information and the composite score of the user 202. Moreover, the notification form provides details of the requesting party 208 and provides the purpose of the query. In this example, the notification message comprises the following information: Request date: Jan 1, 2011; requested by: ABCXYZ company; reason for query: employment; weight specified for evaluation score: default [70%]; weight specified for user authentication score: default [30%]; request for: composite score only; composite score: 83; and composite score percentile: 95%. The validation platform 201 then transmits the notification message to the user 202 via the network 204 for obtaining the user's 202 consent for releasing the retrieved social information and the determined composite score to the requesting party 208. In an embodiment, the validation platform 201 transmits the notification to the user 202 via the network 204 on determining that the composite score of the user 202 is greater than the search criteria of the requesting party 208.

FIG. 9D exemplarily illustrates the response of the user 202 to the notification transmitted by the validation platform 201. On receiving the notification, the user 202 has an option to either approve or disapprove releasing the user's 202 social information and the composite score to the requesting party 208. The validation platform 201 transmits the user's 202 social information and the composite score to the requesting party 208 via the network 204, on receiving the user's 202 approval and withholds the user's 202 social information and the composite score on receiving the user's 202 disapproval.

Figure 10:
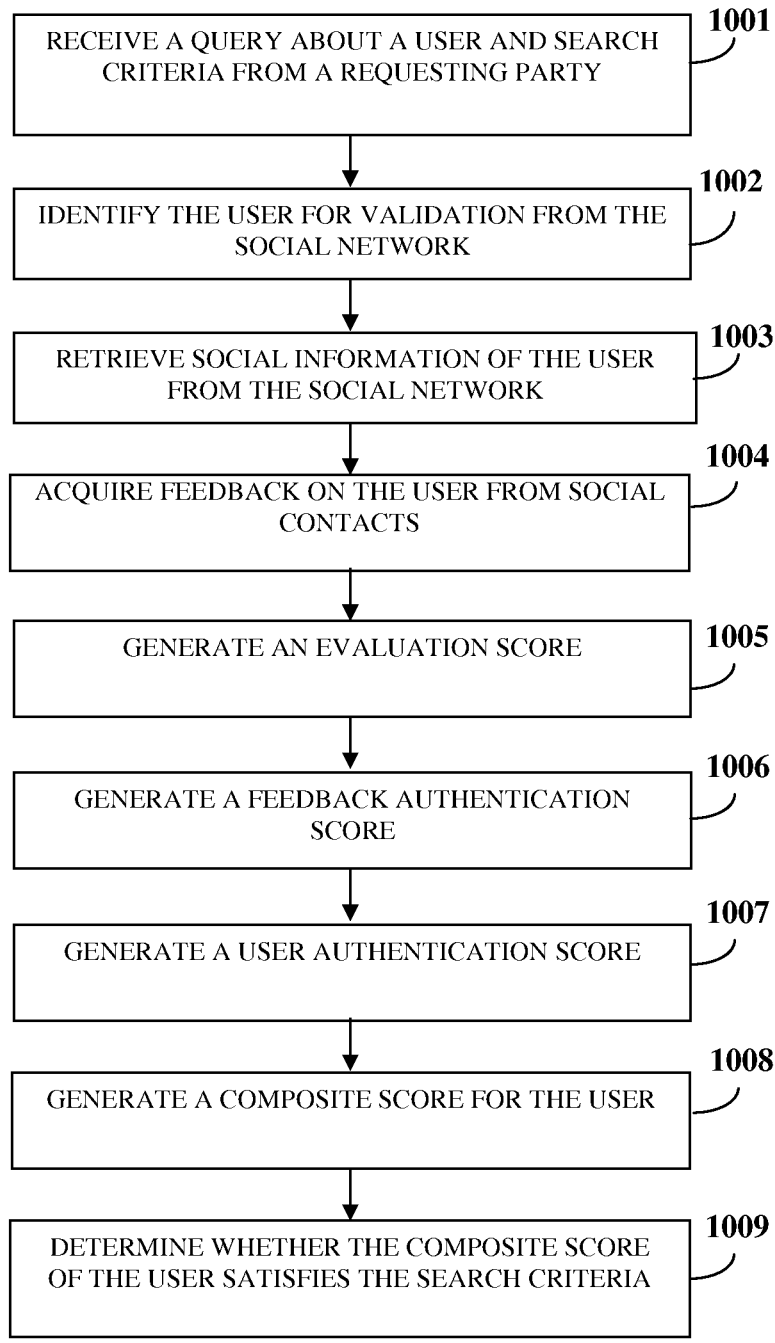
FIG. 10 exemplarily illustrates a flowchart comprising the steps for generating a composite score for the user based on a combination of an evaluation score, a feedback authentication score, and a user authentication score, in response to a query from a requesting party.

FIG. 10 exemplarily illustrates a flowchart comprising the steps for generating a composite score for the user 202 based on a combination of an evaluation score, a feedback authentication score, and a user authentication score, in response to a query from a requesting party 208. Consider an example where the validation platform 201 receives 1001 a query about the user 202, Jeff, registered on social network P and social network Q, from a requesting party 208 such as a dating website. The validation platform 201 also receives 1001 the search criteria that determine, for example, extroversion of Jeff for gauging the suitability of Jeff as a match for an extroverted member of the dating website, Tina. The validation platform 201 identifies 1002 Jeff, registered on the social network P and the social network Q. The validation platform 201 then retrieves 1003 social information of Jeff from the social networks P and Q.

The validation platform 201 transmits a feedback form to one or more of Jeff's social contacts 203 in the social networks P and Q, for acquiring feedback on Jeff. In this example, the feedback form comprises a questionnaire on attributes such as gregariousness of the user 202, assertiveness of the user 202, outgoingness of the user 202, sociability of the user 202, confidence of the user 202, etc. The validation platform 201 acquires 1004 the feedback on Jeff provided by his social contacts 203. The validation platform 201 generates 1005 the evaluation score for Jeff based on the feedback acquired from the social contacts 203. The validation platform 201 then generates 1006 the feedback authentication score for the acquired feedback based on feedback authentication criteria for determining the authenticity of the relationship between Jeff and each of the social contacts 203. The feedback authentication criteria, in this example, comprise degree of separation with the user 202, number of mutual social contacts 203 with the user 202, number of years the social contacts 203 have been in the user's 202 social network 207, number of feedback assessments completed by the social contacts 203, and number of feedback assessments received by the social contacts 203.

The validation platform 201 generates 1007 the user authentication score based on the user authentication criteria. The user authentication criteria comprises the level of activity on the social networks P and Q such as the number of messages sent and received by Jeff, Jeff's login frequency, etc., the number of social contacts 203, the number of second degree contacts of Jeff, and the length of time that Jeff has been registered on social networks P and Q.

The validation platform 201 then generates 1008 a composite score based on a weighted combination of the evaluation score, the feedback authentication score, and the user authentication score. In an example, the validation platform 201 assigns the followings weights for generating the composite score: 70% of the evaluation score, 15% of the feedback authentication score, and 15% of the user authentication score. The composite score generated by the validation platform 201 can be used to gauge the extroversion of Jeff. The validation platform 201 then compares the composite score of Jeff to the search criteria provided by the dating website for determining 1009 whether Jeff's composite score satisfies the search criteria, that is, to determine whether or not Jeff would make a good match for Tina.

FIGS. 11A-11G exemplarily illustrate generation and updation of a user's 202 social network profile by the validation platform 201 based on feedback acquired from the user's 202 social contacts 203, in the absence of a query from a requesting party 208. FIG. 11A exemplarily illustrates a social network profile of a user 202 generated by the validation platform 201. Consider an example of a user 202 Paul Shore registered on a social network X. The profile generation module 201h of the validation platform 201 generates a social network profile for Paul Shore, for example, based on the retrieved social information, the acquired feedback, and one or more of Paul Shore's validation scores. In this example, the profile of Paul Shore comprises the following information: name: Paul Shore, age: 26, sex: male, date of birth: Mar. 1, 1984, school: University of Michigan, and composite score: 80.

FIG. 11B exemplarily illustrates a feedback request form provided to the user 202 by the validation platform 201. The feedback request form enables the user 202 to select the social contacts 203 from whom the user 202 would like to acquire the feedback. In this example, the feedback request form shows that the user 202 Paul Shore has selected the social contacts 203 Jane Doe, Jack Jones, Andy Grace, Amar Jackson, and Zack Pearce, for acquiring feedback. The user 202 may review the feedback acquired from the selected social contacts 203 after, for example, three of the selected social contacts 203 provide feedback.

FIGS. 11C-11D exemplarily illustrate a status form displayed on the interactive interface 201a of the validation platform 201 in response to the acquired feedback maintained by the validation platform 201. The status form comprises, for example, the following details: request number, name of the social contact 203, request date for the feedback, status of the feedback, evaluation score, feedback authentication score, and information on whether the feedback has been factored into the user's 202 composite score. The status of the feedback indicates "complete" when a social contact 203 completes the feedback and returns the feedback form 301 to the validation platform 201. The status of the feedback indicates "pending" when a social contact 203 is yet to complete the feedback on the user 202. In this example, the status form indicates that the validation platform 201 had previously acquired feedback on Paul Shore from Shaun White and has now acquired feedback from Andy Grace. Moreover, the status form indicates that the evaluation scores generated for Paul Shore based on the feedback acquired from Andy Grace and Shaun White are 90 and 60 respectively. The status form also indicates that the feedback authentication scores generated for the feedback acquired from Andy Grace and Shaun White are 95 and 40 respectively.

FIG. 11C exemplarily illustrates the updated status form maintained by the validation platform 201 showing that the feedback by one of the social contacts 203 has been factored into the user's 202 composite score. In this example, the status form indicates that the feedback acquired from Shaun White has been factored into Paul Shore's composite score of 80.

FIG. 11D exemplarily illustrates the updated status form maintained by the validation platform 201 showing that the feedback by two of the social contacts 203 has been factored into the user's 202 composite score. In this example, the status form indicates that the feedback acquired from Shaun White and Andy Grace has been factored into Paul Shore's composite score.

FIG. 11E exemplarily illustrates the updated social network profile of Paul Shore in response to the acquired feedback from the Paul Shore's social contacts 203. The validation platform 201 combines the evaluation scores and the feedback authentication scores for Paul Shore based on the feedback acquired from Shaun White and Andy Grace to generate a new composite score of 85 for Paul Shore in this example. The validation platform 201 may also notify Paul Shore that his composite score was updated per fulfillment of one or more of his feedback requests from Jan. 22, 2011. Paul Shore may then be able to review feedback after additional feedback requests have been fulfilled.

FIG. 11F exemplarily illustrates the updated status form maintained by the validation platform 201 showing the updated status of the requested feedback. In this example, the updated status form indicates that feedback has been further acquired from Jane Doe and Amar Jackson, in addition to the previously acquired feedback from Shaun White and Andy Grace. The updated status form further indicates the evaluation scores for Paul based on the acquired feedback and the corresponding feedback authentication scores for the feedback provided by Jane Doe and Amar Jackson, in addition to that provided by Shaun White and Andy Grace. The updated status form further indicates that the evaluation scores and the feedback authentication scores have been factored into the composite score of Paul Shore.

FIG. 11G exemplarily illustrates the updated social network profile of Paul Shore in response to the acquired feedback from Paul Shore's social contacts 203. The validation platform 201, after factoring in the evaluation scores and the feedback authentication scores for Paul Shore by Jane Doe, Shaun White, Amar Jackson, and Andy Grace, generates a new composite score of 88 for Paul Shore in this example. The validation platform 201 may also notify Paul Shore that his composite score was updated per fulfillment of one or more of his feedback requests from Jan. 22, 2011. Paul Shore can retrieve the feedback by clicking on a link provided by the validation platform 201.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor, or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes the main memory. Volatile media comprise, for example, a register memory, processor cache, a random access memory (RAM), etc. Transmission media comprise, for example, coaxial cables, copper wire and fiber optics, including the wires that constitute a system bus coupled to a processor. Common forms of computer readable media comprise, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, and digital signal processors or like devices. Typically, a processor receives instructions from a memory or like device, and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Thus, embodiments are not limited to any specific combination of hardware and software. In general, the computer program codes comprising computer executable instructions may be implemented in any programming language. Some examples of languages that can be used comprise C, C++, C#, Perl, Python, or JAVA. The computer program codes or software programs may be stored on or in one or more mediums as an object code. The computer program product disclosed herein comprises computer executable instructions embodied in a non-transitory computer readable storage medium, wherein the computer program product comprises computer program codes for implementing the processes of various embodiments.

Where databases are described such as the database 201k, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes, such as those disclosed herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, Sun® processors, IBM® processors, etc., that are adapted to communicate with the computer. Any number and type of machines may be in communication with the computer.

The foregoing examples have been provided merely for the purpose of explanation and are in no way to be construed as limiting of the invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A computer implemented method for generating at least a score for validating a user associated with one or more social networks, comprising:

providing, by a processor, a validation platform associated with said one or more social networks, said validation platform implemented on a computer system comprising one or more processors;

receiving a query from a requesting party by said validation platform through an interface for validating said user, wherein said query comprises a search criteria for identifying said user and a request for one validation score of said user, and wherein said requested validation score comprises at least one of an evaluation score, a feedback authentication score, a user authentication score, and a composite score, by a query processing module;

receiving differential weights from said requesting party by said validation platform for generating said composite score, wherein said received differential weights comprise differential weights for one or more of said evaluation score, said feedback authentication score, and said user authentication score, and wherein sum of one or more of said differential weights equals 100%, by said query processing module;

searching and identifying said user for said validation from said one or more social networks by said validation platform based on said criteria, by a user identification module;

retrieving social information of said identified user from said one or more social networks by said validation platform, wherein said social information comprises relationship information of and between said identified user and social contacts of said identified user on said one or more social networks, wherein said social contacts are associated with said one or more social networks, by an information retrieval module;

receiving feedback on said identified user from one or more of said social contacts by said validation platform, by a feedback acquisition module;

generating one or more of said evaluation score, said feedback authentication score, and said user authentication score for said identified user by said validation platform based on one or more of said retrieved social information and said received feedback, by a score generation module; and generating a composite score for said identified user by said validation platform, by said score generation module, wherein said composite score is a weighted sum of said evaluation score said feedback authentication score, and said user authentication score, whereby said generated validation score enables said validation of said user associated with said one or more social networks.

2. The computer implemented method of claim 1, wherein said generation of said validation score further comprises:

generating said evaluation score for said identified user based on said received feedback, wherein said evaluation score quantifies said received feedback based on an evaluation of a plurality of attributes of said identified user by each of said one or more of said social contacts, by said score generation module;

generating said feedback authentication score for said received feedback, wherein said feedback authentication score quantifies authenticity of said received feedback based on feedback authentication criteria, by said score generation module; and generating said user authentication score for said identified user, wherein said user authentication score quantifies authenticity of said identified user based on user authentication criteria, by said score generation module.

3. The computer implemented method of claim 2, wherein said feedback authentication criteria comprises one or more of degrees of separation between said identified user and said one or more social contacts, said validation score of said one or more social contacts, strength of relationship between said identified user and said one or more social contacts, number of mutual social contacts between said identified user and said one or more social contacts, duration of time that said identified user has been in a social relationship with said one or more social contacts, number of feedback assessments completed by said one or more social contacts, number of feedback assessments received by said one or more social contacts, and a ratio of positive feedback assessments to negative feedback assessments provided by said one or more social contacts.

4. The computer implemented method of claim 2, wherein said user authentication criteria comprises one or more of duration of time that said identified user is associated with said one or more social networks, level of activity of said identified user within said one or more social networks, number of said social contacts of said identified user, and said validation score of said social contacts of said identified user.

5. The computer implemented method of claim 1, further comprising processing said query about said user from a requesting party by said validation platform comprising:
   determining said generated validation score of said user and whether said generated validation score satisfies said search criteria;
   obtaining consent from said user to transmit said validation score to said requesting party; and
   transmitting a response to said query to said requesting party based on said determination and said consent.

6. The computer implemented method of claim 5, wherein said search criteria comprises a threshold validation score for said user, wherein said threshold validation score represents a minimum score acceptable to said requesting party, and wherein said search criteria further comprises said differential weights for said one or more of said evaluation score, said feedback authentication score, and said user authentication score combinable for generating said composite score.

7. The computer implemented method of claim 5, further comprising generating a list of users associated with said one or more social networks who satisfy said search criteria of said requesting party by said validation platform.

8. The computer implemented method of claim 1, wherein alternatively said differential weights and receiving from one of said user, said one or more social contacts, and default settings inside said validation platform.

9. The computer implemented method of claim 1, wherein said validation platform selectively maintains anonymity of said received feedback from said one or more social contacts.

10. The computer implemented method of claim 1, wherein said retrieval of said social information of said identified user comprises querying and compiling said social information of said identified user from a plurality of said social networks by said validation platform, wherein said validation platform generates said validation score for each of said social networks.

11. The computer implemented method of claim 1, further comprising generating an aggregated social network profile for said identified user by aggregating said social information of said identified user from a plurality of social network profiles of said identified user across said plurality of said social networks, wherein said aggregated social network profile is accessible through one of an interface on said validation platform and through one or more of said social networks.

12. The computer implemented method of claim 1, further comprising aggregating said validation score generated for each of said plurality of said social networks of said identified user for generating one or more aggregate validation score for said identified user for a holistic validation of said identified user.

13. A computer implemented system for validating a user associated with one or more social networks, comprising:
   a validation platform associated with said one or more social networks, wherein said validation platform comprises:
   a query processing module configured for processing a query about said user, wherein said query is received from a requesting party through an interface of said validation platform, wherein said query comprises a search criteria for identifying said user and a request for validation score of said user, wherein said requested validation score comprises at least one of an evaluation score, a feedback authentication score, a user authentication score, and a composite score;
   said query processing module further configured to receive differential weights from said requesting party for generating said composite score, wherein said received differential weights comprise differential weights for one or more of said evaluation score, said feedback authentication score, and said user authentication score, and wherein sum of one or more of said received differential weights equals 100%;
   a search engine configured for searching said user for said validation from said one or more social networks based on said search criteria;
   a user identification module that identifies said user for said validation from said one or more social networks;
   an information retrieval module that retrieves social information of said identified user from said one or more social networks, wherein said social information comprises relationship information of and between said identified user and social contacts of said identified user on said one or more social networks, wherein said social contacts are associated with said one or more social networks;
   a feedback acquisition module that receives feedback on said identified user from one or more of said social contacts;
   a score generation module that generates one or more of said evaluation score, said feedback authentication score, and said user authentication score for said identified user based on one or more of said retrieved social information and said received feedback; and
   said score generation module that further generates a composite score for said identified user, wherein said composite score is a weighted sum of said evaluation score said feedback authentication score and said user authentication score whereby said generated validation score enables said validation of said user associated with said one or more social networks.

14. The computer implemented system of claim 13, wherein said score generation module generates said validation score by performing one or more of:
   generating an evaluation score for said identified user based on said acquired feedback, wherein said evaluation score quantifies said acquired feedback based on an evaluation of a plurality of attributes of said identified user by each of said one or more social contacts;
   generating a feedback authentication score for said acquired feedback, wherein said feedback authentication score quantifies authenticity of said acquired feedback based on feedback authentication criteria; generating a user authentication score liar said identified user, wherein said user authentication score quantifies authenticity of said identified user based on user authentication criteria; and
   generating a composite score for said identified user based on a weighted combination of one or more of said evaluation score, said feedback authentication score, and said user authentication score.

15. The computer implemented system of claim 13, wherein said query processing module further performs:
   determining said generated validation score of said user and whether said generated validation score satisfies said search criteria;
   obtaining a consent from said user to transmit said validation score to said requesting party; and
   transmitting a response to said query to said requesting party based on said determination and said consent.

16. The computer implemented system of claim 15, wherein said query processing module generates a list of users associated with said one or more social networks who satisfy said search criteria of said requesting party.

17. The computer implemented system of claim 13, wherein said validation platform further comprises:
an aggregation module that aggregates said social information of said identified user from a plurality of social network profiles of said identified user across a plurality of said social networks; and
a profile generation module that generates an aggregated social network profile for said identified user based on said aggregated social information, wherein said aggregated social network profile is accessible through one of an interface on said validation platform and through said one or More of said social networks.

18. The computer implemented system of claim 13, wherein said validation platform further comprises an aggregate score generation module that generates aggregate validation score for said identified user by aggregating said validation score generated for each of said plurality of said social networks of said identified user for a holistic validation of said identified user.

19. A non-transitory machine-readable medium comprising instructions, which when implemented by one or more processors perform operations, comprising:
receiving a query from a requesting party by a validation platform through an interface for validating a user associated with one or more social networks, wherein said query comprises a search criteria for identifying said user and a request for validation score of said user, and wherein said requested validation score comprises at least one of an evaluation score, a feedback authentication score, a user authentication score, and a composite score;
receiving differential weights from said requesting party by said validation platform for generating said composite score, wherein said received differential weights comprise differential weights for one or more of said evaluation score, said feedback authentication score, and said user authentication score, and wherein sum of one or more of said differential weights equals 100%;
searching and identifying said user for validation from said one or more social networks based on said search criteria;
retrieving social information of said identified user from said one or more social networks, wherein said social information comprises relationship information of and between said identified user and social contacts of said identified user on said one or more social networks, wherein said social contacts are associated with said one or more social networks;
receiving feedback on said identified user from one or more of said social contacts;
generating one or more of said evaluation score said feedback authentication score, and said user authentication score for said identified user by said validation platform based on one or more of said retrieved social information and said received feedback; and
generating a composite score for said identified user by said validation platform, wherein said composite score is a weighted sum of said evaluation score, said feedback authentication score and said user authentication score, whereby said generated validation score enables said validation of said user associated with said one or more social networks.

20. The non-transitory machine-readable medium of claim 19, further performing operations, comprising:
generating said evaluation score for said identified user based on said received feedback, wherein said evaluation score quantifies said received feedback based on an evaluation of a plurality of attributes of said identified user by one or more social contacts;
generating said feedback authentication score for said received feedback, wherein said feedback authentication score quantifies authenticity of said received feedback based on feedback authentication criteria;
generating said user authentication score for said identified user, wherein said user authentication score quantifies authenticity of said identified user based on user authentication criteria; and
determining said generated validation score of said user and whether said generated validation score satisfies said search criteria;
obtaining a consent from said user to transmit said validation score to said requesting party; and
transmitting a response to said query to said requesting party based on said determination and said consent.

21. A computer implemented method for validating one or more users associated with one or more social networks, comprising:
providing, by a processor, a validation platform associated with said one or more social networks, said validation platform implemented on a computer system comprising one or more processors;
receiving a query from a requesting party by said validation platform through an interface for validating said user, wherein said query comprises a search criteria for identifying said user and a request for validation score of said user, and wherein said requested validation score comprises at least one of an evaluation score, a feedback authentication score, a user authentication score, and a composite score;
searching and identifying said one or more users for said validation from said one or more social networks by said validation platform based on said search criteria;
retrieving social information of said identified user from said one or more social networks by said validation platform wherein said social information comprises relationship information of and between said identified one or more users and social contacts of said identified one or more users on said one or more social networks, wherein said social contacts are associated with said one or more social networks;
receiving feedback on said identified user from one or more of said social contacts by said validation platform, wherein said validation platform selectively maintains anonymity of said received feedback from said one or more social contacts; and
generating said one or more of said evaluation score, said feedback authentication score, and said user authentication score for said identified user by said validation platform based on one or more of said retrieved social information and said received feedback by said validation platform;
whereby said generated validation score enables said validation of said one or more users associated with said one or more social networks.

22. A computer implemented method for validating one or more users associated with one or more social networks, comprising:
providing, by a processor, a validation platform associated with said one or more social networks, said validation platform implemented on a computer system comprising one or more processors;

receiving a query from a requesting party by said validation platform through an interface for validating said user, wherein said query comprises a search criteria for identifying said user and a request for validation score of said user, and wherein said requested validation score comprises at least one of an evaluation score, a feedback authentication score, a user authentication score;

searching and identifying said one or more users for said validation from said one or more social networks by said validation platform based on said search criteria;

retrieving social information of said identified user from said one or more social networks by said validation platform wherein said social information comprises relationship information of and between said identified one or more users and social contacts of said identified one or more users on said one or more social networks, wherein said social contacts are associated with said one or more social networks;

receiving feedback on said identified user from one or more of said social contacts by said validation platform; and generating said one or more of said evaluation score, said feedback authentication score, and said user authentication score for said identified user by said validation platform based on one or more of said retrieved social information and said received feedback;

whereby said generated validation score enables said validation of said user associated with said one or more social networks.

23. A method for generating a score for a validating a user associated with at least a social network, said method comprising:

receiving, by a processor, at least a query from at least a requesting party for validating a user;

identifying at least a user for said validation;

retrieving at least social information of said identified user from said social network;

acquiring at least feedback from at least a social contact associated with said social network:

aggregating at least social information of said identified user from at least a social network profile of said identified user;

generating at least a profile for said identified user based On at least one of said retrieved social information, said acquired feedback, and said generated validation score;

generating an evaluation score by, producing at least a score for quantifying at least acquired feedback based on evaluation of a plurality of attributes of said identified user by one or more social contacts of said user;

generating a feedback authentication score by, producing at least a score for quantifying at least authenticity of said acquired feedback based on at least feedback authentication criteria, wherein said feedback authentication criteria is determined using at least data related to authenticity of relationship between said identified user and said social contacts who provide said feedback;

generating a user authentication score by, producing at least a score for quantifying at least authenticity of said identified user based on at least user authentication criteria, wherein said user authentication criteria is determined using at least data related to at least one of a duration of time that, said identified user is associated with said social network, a level of activity of said identified user in said social network, a number of social contacts of said identified user, a validation score of said social contact of said identified user;

generating at least an aggregate validation score for said identified user by defining at least an instruction for aggregating at least one of said evaluation score, said feedback authentication score and said user authentication score, wherein at least a weighted combination of each of said scores is utilized in generating said composite score for said identified user; and determining, using said aggregate validation score, a validity of said identified user based at least a threshold validation score by said requesting party.

24. A system for generating a score for a validating a user associated with at least a social network, said system comprising:

at least a processor; and at least a storage medium comprising instructions, wherein said instructions cause said hardware processor to:

receive at least a query from at least a requesting party for validating a user, by a query processing module;

identify at least a user for said validation, by a user identification module;

retrieve at least social information of said identified user from said social network, by an information retrieval module;

acquire at least feedback from at least a social contact associated with said social network, by a feedback acquisition module;

aggregate at least social information of said identified user from at least a social network profile of said identified user, by an aggregation module;

generate at least a profile for said identified user based on at least one of said retrieved social information, said acquired feedback, and said generated validation score, by a profile generation module;

generate an evaluation score by a score generation module, wherein said score generation module is configured to produce at least an evaluation score for quantifying at least acquired feedback based on evaluation of a plurality of attributes of said identified user by one or more social contacts of said user, generate a feedback authentication score by said score generation module, wherein said score generation module is configured to produce at least a feedback authentication score for quantifying at least authenticity of said acquired feedback based on at least feedback authentication criteria, wherein said feedback authentication criteria is determined using at least data related to authenticity of relationship between said identified user and said social contacts who provide said feedback;

generate a user authentication score by said score generation module, wherein said score generation module is configured to produce at least a user authentication score for quantifying at least authenticity of said identified user based on at least .user authentication criteria. wherein said user authentication criteria is determined using at least data related to at least one of a duration of time that said identified user is associated with said social network, a level of activity of said identified user in said social network, a number of social contacts of said identified user, a validation score of said social contact of said identified user;

generate at least an aggregate validation score for said identified user by defining at least an instruction for aggregating at least one of said evaluation score, said feedback authentication score and said user authentication score, wherein at least a weighted combination of each of said scores is utilized in generating said composite score for said identified user, by an aggregate score generation module; and determine, using said aggregate validation score, a validity of said identified user based at least a threshold validation score by said requesting party, by said aggregate score generation module.

25. The method as claimed in claim 23, said method further comprising:

receiving, from said requesting party, at least one of a search criterion and a query for retrieving at least a plurality of users of said social network;

assessing at least an aspect of said user, said aspect stored in a profile of said social network of said user; and providing at least a unique identifier of said user matching at least one of said search criterion and said query from said requesting party.

26. The system as claimed in claim 24, said system further configured to:

receive, from said requesting party, at least one of a search criterion and a query for retrieving at least a plurality of users of said social network;

assess at least an aspect of said user, said aspect stored in a profile of said social network of said user; and provide at least a unique identifier of said user matching at least one of said search criterion and said query from said requesting party.

* * * * *